US012587338B2

(12) United States Patent
Li et al.

(10) Patent No.: US 12,587,338 B2
(45) Date of Patent: Mar. 24, 2026

(54) DEMODULATION REFERENCE SIGNAL ENHANCEMENTS FOR CONTROL CHANNEL REPETITIONS

(71) Applicant: QUALCOMM Incorporated, San Diego, CA (US)

(72) Inventors: Qiaoyu Li, Beijing (CN); Chao Wei, Beijing (CN); Jing Lei, San Diego, CA (US); Huilin Xu, Temecula, CA (US); Wanshi Chen, San Diego, CA (US); Peter Gaal, San Diego, CA (US); Hao Xu, Beijing (CN); Gokul Sridharan, Sunnyvale, CA (US); Hwan Joon Kwon, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 517 days.

(21) Appl. No.: 17/995,480

(22) PCT Filed: May 13, 2020

(86) PCT No.: PCT/CN2020/089955
§ 371 (c)(1),
(2) Date: Oct. 4, 2022

(87) PCT Pub. No.: WO2021/226860
PCT Pub. Date: Nov. 18, 2021

(65) Prior Publication Data
US 2023/0246778 A1 Aug. 3, 2023

(51) Int. Cl.
*H04L 5/00* (2006.01)
*H04L 1/1867* (2023.01)
(52) U.S. Cl.
CPC ............ *H04L 5/0051* (2013.01); *H04L 1/189* (2013.01)

(58) Field of Classification Search
None
See application file for complete search history.

(56) References Cited

U.S. PATENT DOCUMENTS 9,749,144 B2 8/2017 Xu et al.
9,954,660 B2 * 4/2018 Zhang ................. H04W 52/143
(Continued)

FOREIGN PATENT DOCUMENTS

CN 108352973 7/2018
CN 110474698 A * 11/2019 ............. H04B 17/30
(Continued)

OTHER PUBLICATIONS

Huawei., et al., "PDCCH Repetition for URLLC", 3GPP Draft; R1-1809341, 3rd Generation Partnership Project (3GPP), Mobile Competence Centre; 650, Route Des Lucioles; F-06921 Sophia-Antipolis Cedex; France, vol. RAN WG1, No. Gothenburg, Sweden; Aug. 20, 2018-Aug. 1, 2018, Aug. 11, 2018 (Aug. 11, 2018), XP051516705, 7 pages.
(Continued)

*Primary Examiner* — Andrew C Oh
(74) *Attorney, Agent, or Firm* — Holland & Hart LLP

(57) ABSTRACT

Methods, systems, and devices for wireless communications are described. A user equipment (UE) and a base station may communicate using demodulation reference signal enhancements for control channel repetitions. The UE and the base station may identify a configuration to use to receive or transmit a set of repetitions of control information on a downlink control channel, each repetition of the set of repetitions including one or more symbol periods for an instance of the repeated control information. The base station may transmit, and the UE may receive, a first set of demodulation reference signals in accordance with a first set of parameter values, a second set of demodulation reference signals in accordance with a second set of parameter values, (Continued)

_____ 200 and instances of the control information during the set of repetitions. The UE may decode the control information based on the received signals and configuration.

30 Claims, 21 Drawing Sheets

(56)                References Cited

U.S. PATENT DOCUMENTS

| | | | |
|---|---|---|---|
| 11,310,011 B2 | 4/2022 | Hao et al. | |
| 11,553,471 B2 * | 1/2023 | Sun | H04L 5/0094 |
| 2013/0301434 A1 * | 11/2013 | Krishnamurthy | H04L 5/0053 |
| | | | 370/252 |
| 2014/0241287 A1 * | 8/2014 | Cheng | H04W 72/563 |
| | | | 370/329 |
| 2016/0205571 A1 * | 7/2016 | Yi | H04L 5/0055 |
| | | | 370/252 |
| 2016/0270038 A1 * | 9/2016 | Papasakellariou | H04L 1/1896 |
| 2017/0150486 A1 | 5/2017 | Ang et al. | |
| 2017/0265171 A1 * | 9/2017 | Rico Alvarino | H04L 5/0048 |
| 2017/0289899 A1 * | 10/2017 | You | H04L 5/0007 |
| 2017/0325256 A1 * | 11/2017 | Islam | H04W 72/23 |
| 2017/0332359 A1 * | 11/2017 | Tsai | H04W 68/02 |
| 2018/0092080 A1 * | 3/2018 | Kim | H04L 5/0053 |
| 2018/0337757 A1 * | 11/2018 | Noh | H04L 27/26 |
| 2019/0044669 A1 * | 2/2019 | Davydov | H04L 5/005 |
| 2019/0141703 A1 * | 5/2019 | Gupta | H04L 5/0051 |
| 2019/0165831 A1 * | 5/2019 | Zhou | H04B 7/0408 |
| 2019/0222400 A1 * | 7/2019 | Bagheri | H04L 5/0082 |
| 2019/0327048 A1 * | 10/2019 | Hosseini | H04B 7/0697 |
| 2019/0334689 A1 * | 10/2019 | Kwak | H04W 76/11 |
| 2019/0342030 A1 * | 11/2019 | Hosseini | H04L 1/18 |
| 2020/0008235 A1 * | 1/2020 | Sarkis | H04W 72/21 |
| 2020/0015258 A1 * | 1/2020 | Zhou | H04W 72/20 |
| 2020/0022139 A1 * | 1/2020 | Zhou | H04W 72/0446 |
| 2020/0022144 A1 * | 1/2020 | Papasakellariou | |
| | | | H04W 72/0453 |
| 2020/0053702 A1 * | 2/2020 | Cheng | H04L 1/08 |
| 2020/0106559 A1 * | 4/2020 | Vilaipornsawai | H04L 1/1896 |
| 2020/0196346 A1 * | 6/2020 | Khoshnevisan | H04L 1/08 |
| 2020/0267750 A1 * | 8/2020 | Park | H04B 7/024 |
| 2021/0400646 A1 * | 12/2021 | Horiuchi | H04L 1/1819 |
| 2022/0095304 A1 * | 3/2022 | Muruganathan | H04B 7/024 |
| 2022/0116247 A1 * | 4/2022 | Sengupta | H04L 25/0228 |
| 2022/0294580 A1 * | 9/2022 | Wei | H04W 72/0446 |
| 2023/0027316 A1 * | 1/2023 | Xu | H04L 5/0091 |
| 2023/0085874 A1 * | 3/2023 | Khoshnevisan | H04L 5/0023 |
| | | | 370/329 |
| 2023/0156699 A1 * | 5/2023 | Gao | H04W 72/1273 |
| | | | 370/329 |
| 2023/0179356 A1 * | 6/2023 | Li | H04L 1/0071 |
| | | | 370/329 |

FOREIGN PATENT DOCUMENTS

| | | | | | |
|---|---|---|---|---|---|
| CN | 110536451 A | * | 12/2019 | | H04W 72/23 |
| CN | 110546911 A | | 12/2019 | | |
| CN | 107437962 B | * | 9/2020 | | H04W 72/23 |
| CN | 108631986 B | * | 9/2020 | | H04W 72/23 |
| CN | 113545144 A | * | 10/2021 | | H04L 1/08 |
| CN | 113632565 A | * | 11/2021 | | H04W 72/20 |
| CN | 115066947 A | * | 9/2022 | | H04L 27/26132 |
| CN | 115336345 A | * | 11/2022 | | H04B 7/0697 |
| CN | 115804228 A | * | 3/2023 | | H04L 1/08 |
| CN | 114124337 B | * | 9/2023 | | H04L 5/0048 |
| EP | 3282622 A1 | * | 2/2018 | | H04L 5/0092 |
| EP | 3606129 A1 | * | 2/2020 | | H04L 1/1845 |
| JP | 2022520589 A | * | 3/2022 | | H04W 72/23 |
| KR | 20200099952 A | * | 8/2020 | | H04B 7/06956 |
| WO | WO-2013010311 A1 | * | 1/2013 | | H04W 72/23 |
| WO | WO-2014161141 A1 | * | 10/2014 | | H04W 72/23 |
| WO | WO-2015085574 A1 | * | 6/2015 | | H04L 5/0016 |
| WO | WO-2015116534 | | 8/2015 | | |
| WO | WO-2017078299 A1 | * | 5/2017 | | H04W 72/23 |
| WO | WO-2017091678 | | 6/2017 | | |
| WO | WO-2018045307 A1 | * | 3/2018 | | H04W 48/12 |
| WO | WO-2018064313 A1 | * | 4/2018 | | H04L 5/0048 |
| WO | WO-2018175521 A1 | * | 9/2018 | | H04L 5/1469 |
| WO | WO-2019193769 A1 | * | 10/2018 | | H04W 52/16 |
| WO | WO-2018231626 A1 | * | 12/2018 | | H04W 72/21 |
| WO | WO-2019214658 A1 | * | 11/2019 | | H04L 5/0053 |
| WO | WO-2019244217 A1 | | 12/2019 | | |
| WO | WO-2020006416 A1 | * | 1/2020 | | H04L 5/0091 |
| WO | WO-2020030677 A1 | * | 2/2020 | | H04L 5/0055 |
| WO | WO-2020032631 A2 | | 2/2020 | | |
| WO | WO-2020066022 A1 | * | 4/2020 | | H04W 72/23 |
| WO | WO-2020091570 A1 | * | 5/2020 | | H04L 5/0051 |
| WO | WO-2020091572 A1 | * | 5/2020 | | H04L 5/00 |
| WO | WO-2020091973 | | 5/2020 | | |

OTHER PUBLICATIONS

International Search Report and Written Opinion—PCT/CN2020/089955—ISA/EPO—Feb. 20, 2021.
Supplementary European Search Report—EP20935954—Search Authority—The Hague—Dec. 11, 2023.

* cited by examiner

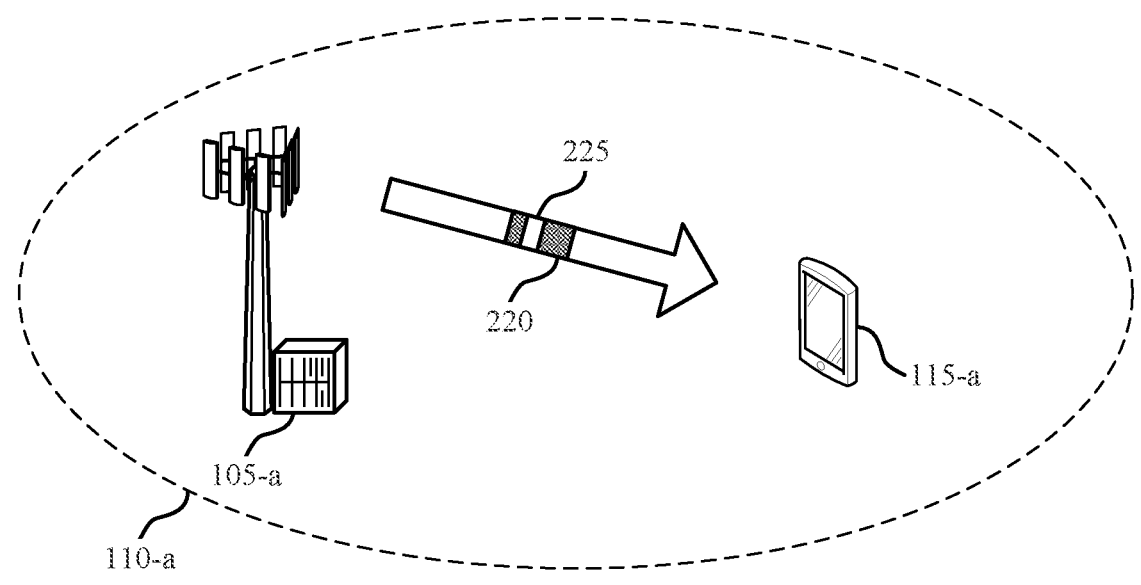
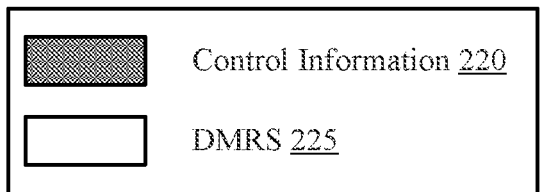
FIG. 2

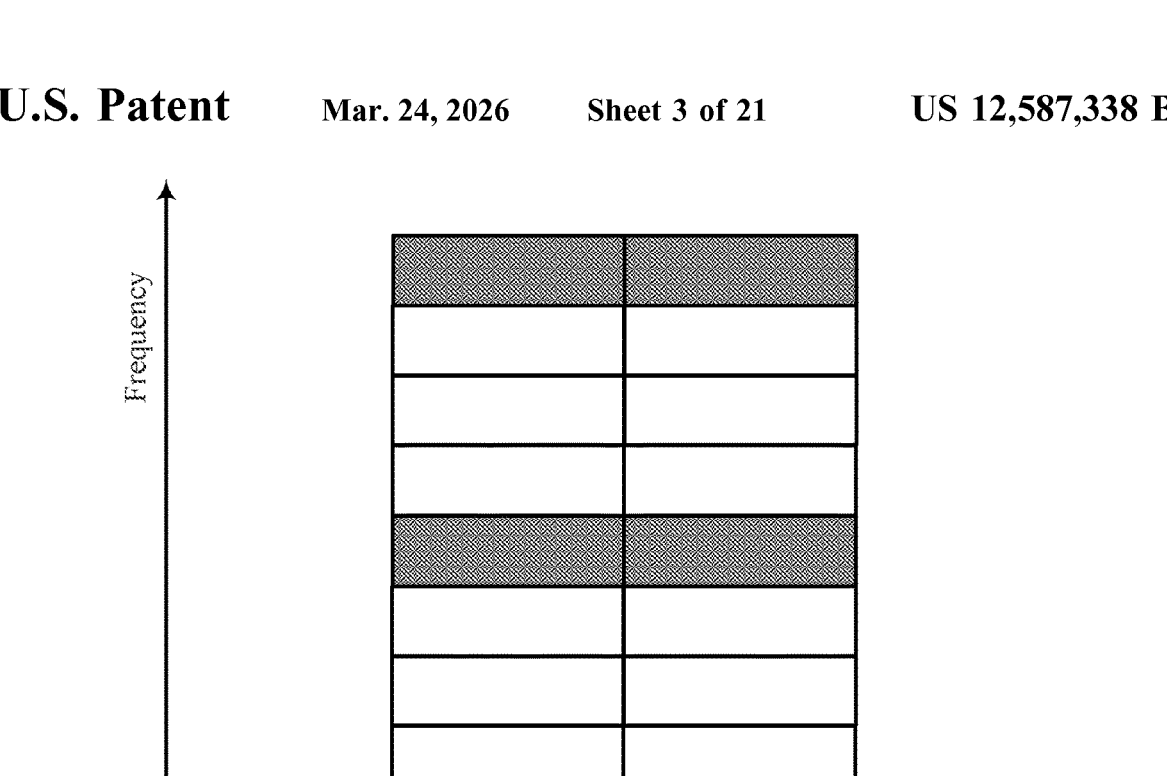
Repetition 315
Frequency
Time
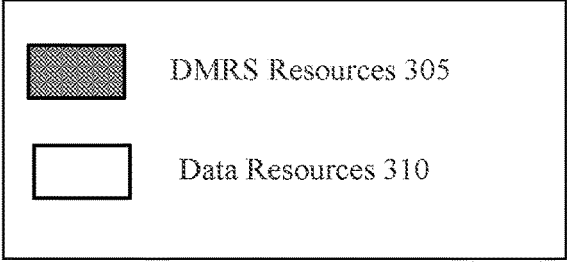
DMRS Resources 305
Data Resources 310
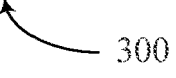
300
FIG. 3

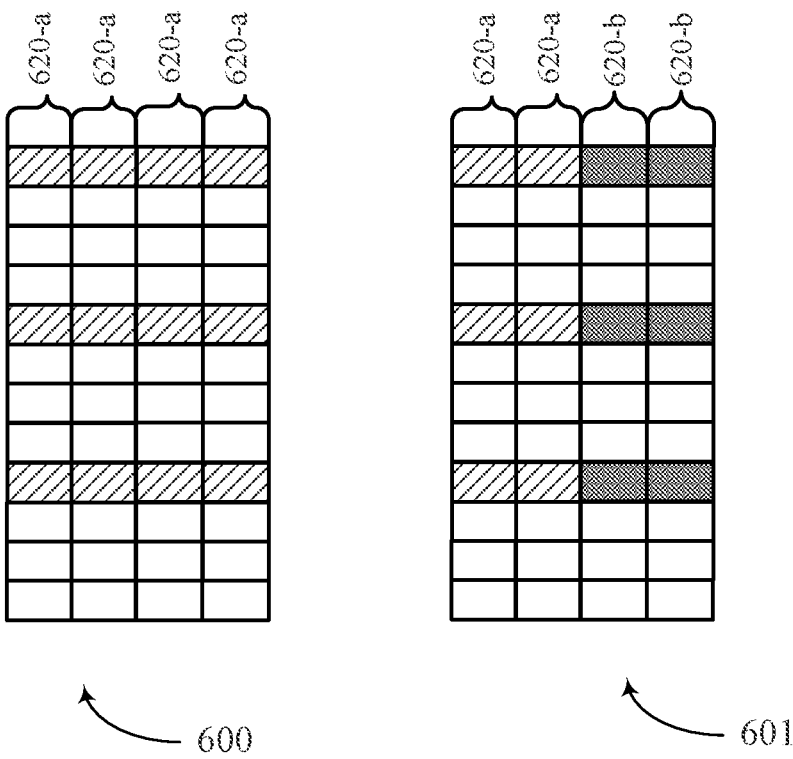
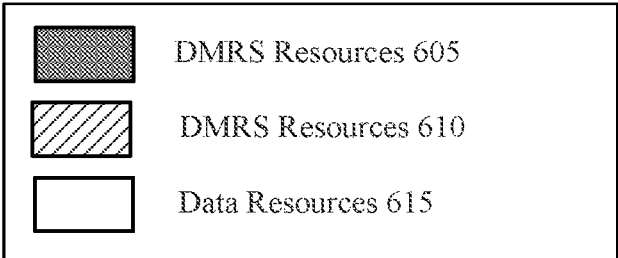
FIG. 6

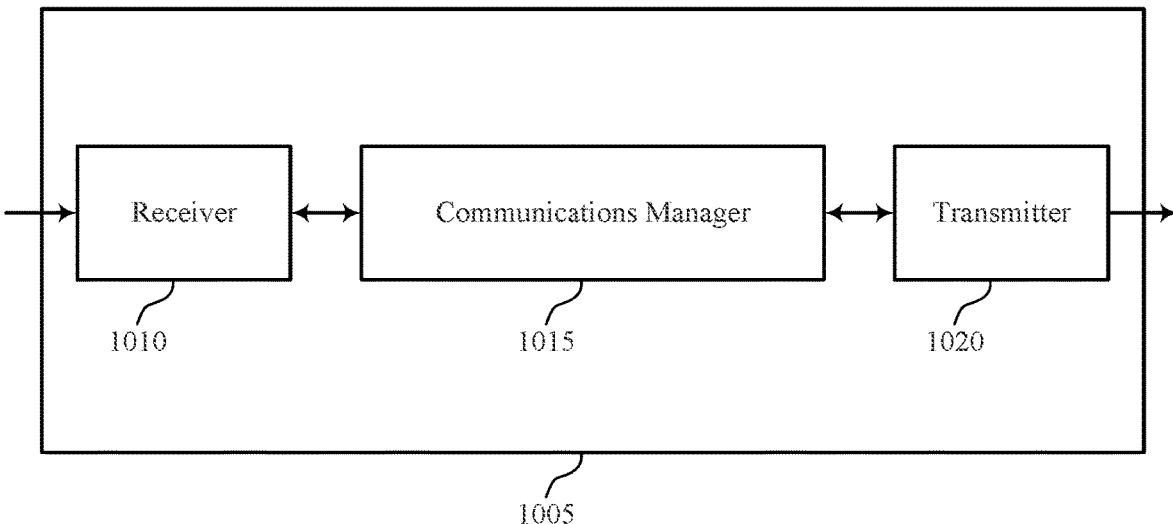
FIG. 10

1410

1415

1420

1405

1400

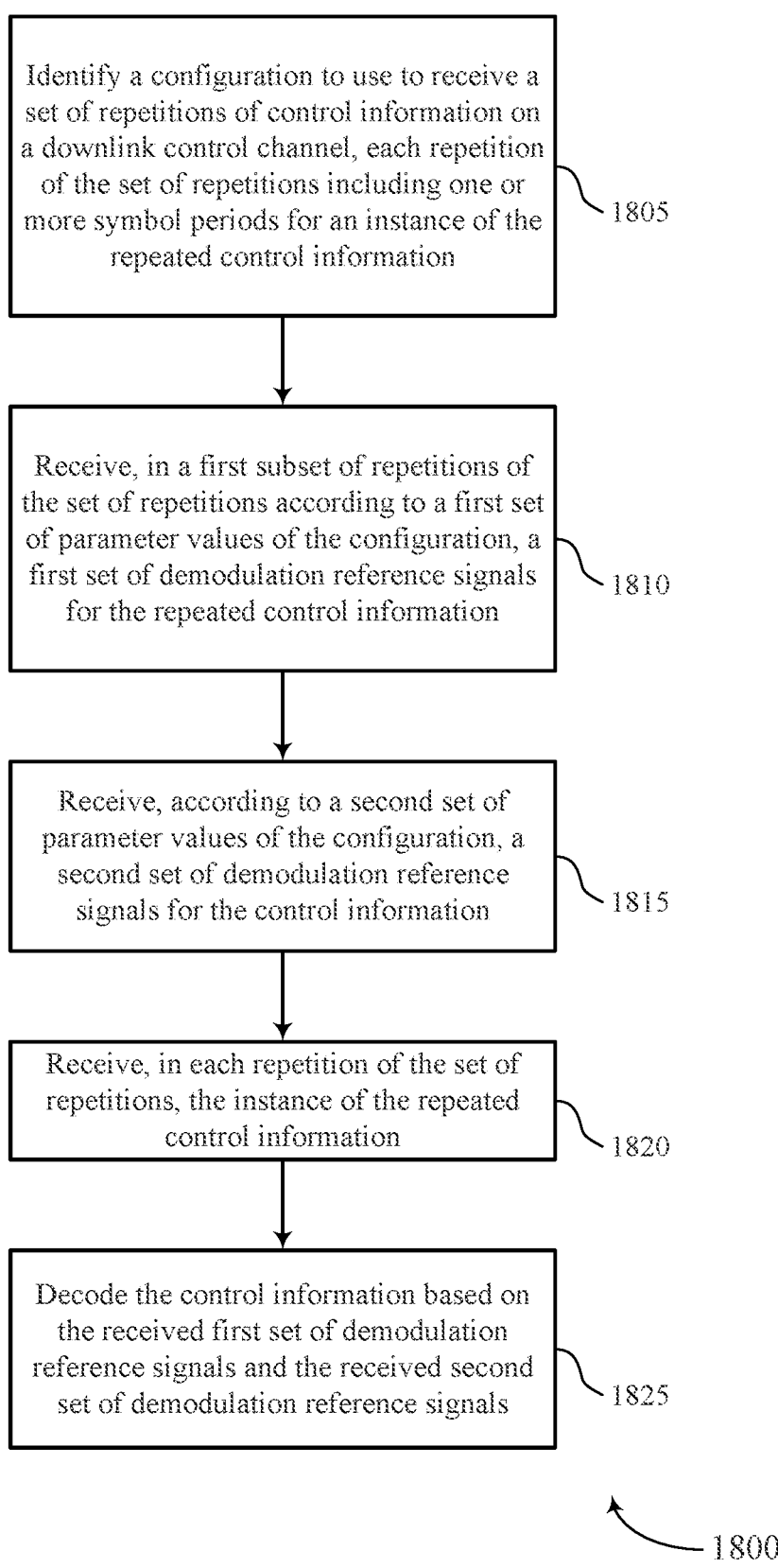

Identify a configuration to use to receive a set of repetitions of control information on a downlink control channel, each repetition of the set of repetitions including one or more symbol periods for an instance of the repeated control information
⎯ 1805

Receive, in a first subset of repetitions of the set of repetitions according to a first set of parameter values of the configuration, a first set of demodulation reference signals for the repeated control information
⎯ 1810

Receive, according to a second set of parameter values of the configuration, a second set of demodulation reference signals for the control information
⎯ 1815

Receive, in each repetition of the set of repetitions, the instance of the repeated control information
⎯ 1820

Decode the control information based on the received first set of demodulation reference signals and the received second set of demodulation reference signals
⎯ 1825

Figure 19:
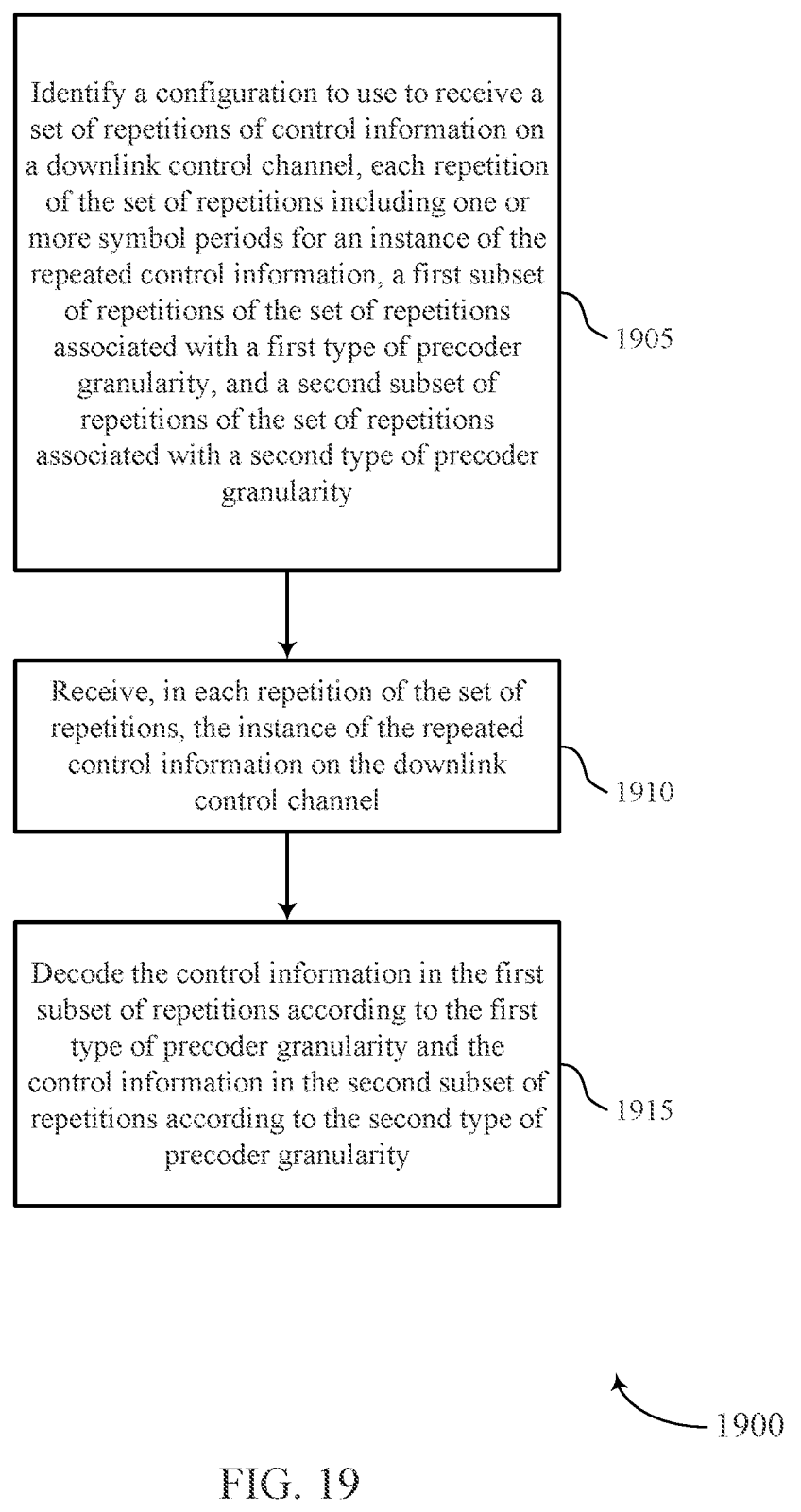

Identify a configuration to use to receive a set of repetitions of control information on a downlink control channel, each repetition of the set of repetitions including one or more symbol periods for an instance of the repeated control information, a first subset of repetitions of the set of repetitions associated with a first type of precoder granularity, and a second subset of repetitions of the set of repetitions associated with a second type of precoder granularity

1905

Receive, in each repetition of the set of repetitions, the instance of the repeated control information on the downlink control channel

1910

Decode the control information in the first subset of repetitions according to the first type of precoder granularity and the control information in the second subset of repetitions according to the second type of precoder granularity

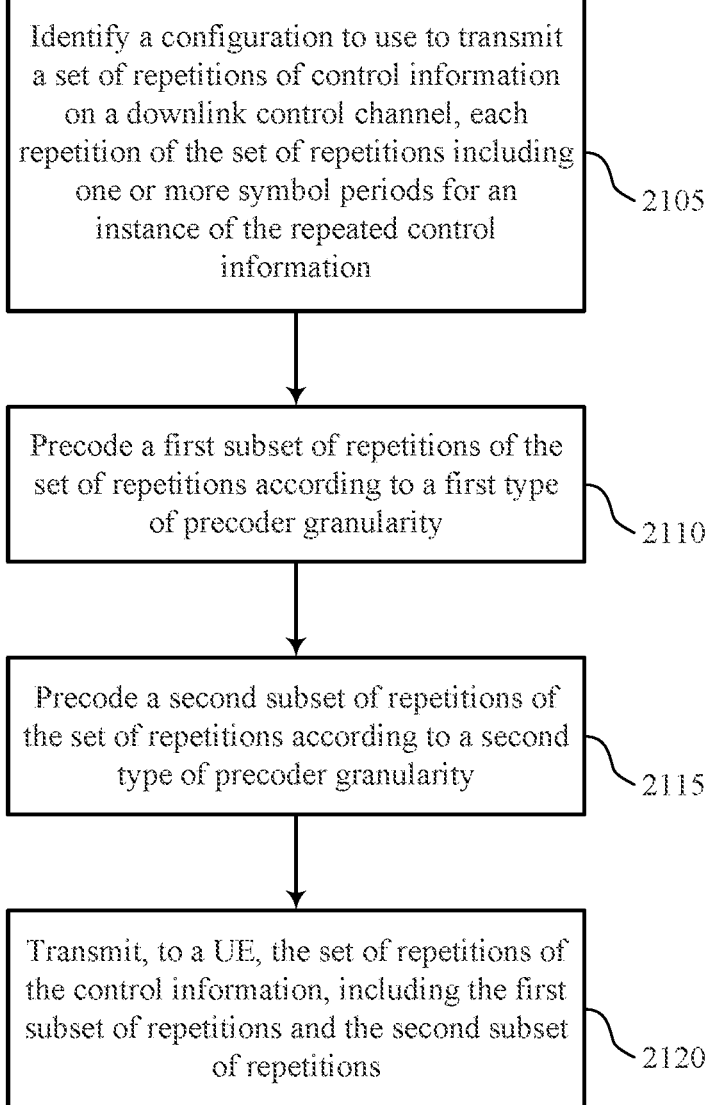

Identify a configuration to use to transmit a set of repetitions of control information on a downlink control channel, each repetition of the set of repetitions including one or more symbol periods for an instance of the repeated control information

2105

Precode a first subset of repetitions of the set of repetitions according to a first type of precoder granularity

2110

Precode a second subset of repetitions of the set of repetitions according to a second type of precoder granularity

2115

Transmit, to a UE, the set of repetitions of the control information, including the first subset of repetitions and the second subset of repetitions

DEMODULATION REFERENCE SIGNAL ENHANCEMENTS FOR CONTROL CHANNEL REPETITIONS

CROSS REFERENCE

The present application is a 371 national stage filing of International PCT Application No. PCT/CN2020/089955 by Li et al. entitled "DEMODULATION REFERENCE SIGNAL ENHANCEMENTS FOR CONTROL CHANNEL REPETITIONS," filed May 13, 2020, which is assigned to the assignee hereof, and which is expressly incorporated by reference in its entirety herein.

FIELD OF TECHNOLOGY

The following relates generally to wireless communications and more specifically to demodulation reference signal enhancements for control channel repetitions.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE). Some wireless communications systems may experience relatively poor performance. For example, a UE may fail to accurately receive or decode a transmission from a base station over a control channel, which may result in relatively inefficient communications.

SUMMARY

The described techniques relate to improved methods, systems, devices, and apparatuses that support demodulation reference signal (DMRS) enhancements for control channel repetitions. Generally, the described techniques may enable one or more wireless devices (e.g., a user equipment (UE), a base station, etc.) to implement one or more DMRS schemes for transmitting or receiving repetitions of control information on a control channel, which may result in improved performance and communication efficiency. For example, a UE or a base station may identify a configuration to use to receive or transmit a set of repetitions of control information on a downlink control channel. The configuration may include parameters values in accordance with the one or more DMRS schemes. For example, the configuration may indicate a first set of parameter values for receiving a first set of DMRS transmissions. Additionally or alternatively, the configuration may indicate a second set of parameter values for receiving a second set of DMRS transmissions. The base station may transmit instances of the control information in one or more symbol periods. For example, the base station may transmit a set of repetitions of control information using a control resource set (e.g., a one symbol control resource set, a two symbol control resource set, etc.). The UE may receive the instances of control information during the set of repetitions. In some examples, the configuration may indicate a first type of precoder granularity associated with a first subset of the repetitions and/or a second type of precoder granularity associated with a second subset of the repetitions.

The UE may receive the first set of DMRS transmissions in accordance with the first set of parameter values, the second set of DMRS transmissions in accordance with the second set of parameter values, etc. The UE may decode the control information based at least in part on receiving the first set of DMRS transmissions and the second set of DMRS transmissions. In some examples, parameter values may indicate a DMRS density for receiving one or more DMRS transmissions (e.g., the first set of parameter values may indicate a first quantity of DMRS transmissions per repetition of the first subset of the repetitions, the second set of parameter values may indicate a second quantity of DMRS transmissions per repetition of the second subset of the repetitions, etc.). Additionally or alternatively, the parameter values may include one or more power parameters (e.g., power parameters indicating an energy power ratio between DMRS resource elements and control information resource elements). Additionally or alternatively, the parameter values may indicate a dedicated DMRS symbol prior to the set of repetitions of the control information (e.g., the parameter values may indicate time frequency resources for receiving DMRS transmissions). In some examples, the parameter values may indicate a pattern for receiving the first set of DMRS transmissions and/or the second set of DMRS transmissions (e.g., the parameter values may indicate different resources for receiving the DMRS transmissions in different repetitions).

A method of wireless communications at a UE is described. The method may include identifying a configuration to use to receive a set of repetitions of control information on a downlink control channel, each repetition of the set of repetitions including one or more symbol periods for an instance of the repeated control information, receiving, in a first subset of repetitions of the set of repetitions according to a first set of parameter values of the configuration, a first set of DMRSs for the repeated control information, receiving, according to a second set of parameter values of the configuration, a second set of DMRSs for the control information, receiving, in each repetition of the set of repetitions, the instance of the repeated control information, and decoding the control information based on the received first set of DMRSs and the received second set of DMRSs.

An apparatus for wireless communications at a UE is described. The apparatus may include a processor, memory coupled with the processor, and instructions stored in the memory. The instructions may be executable by the processor to cause the apparatus to identify a configuration to use to receive a set of repetitions of control information on a downlink control channel, each repetition of the set of repetitions including one or more symbol periods for an instance of the repeated control information, receive, in a first subset of repetitions of the set of repetitions according to a first set of parameter values of the configuration, a first set of DMRSs for the repeated control information, receive, according to a second set of parameter values of the configuration, a second set of DMRSs for the control information, receive, in each repetition of the set of repetitions, the instance of the repeated control information, and decode the control information based on the received first set of DMRSs and the received second set of DMRSs.

Another apparatus for wireless communications at a UE is described. The apparatus may include means for identifying a configuration to use to receive a set of repetitions of control information on a downlink control channel, each repetition of the set of repetitions including one or more symbol periods for an instance of the repeated control information, receiving, in a first subset of repetitions of the set of repetitions according to a first set of parameter values of the configuration, a first set of DMRSs for the repeated control information, receiving, according to a second set of parameter values of the configuration, a second set of DMRSs for the control information, receiving, in each repetition of the set of repetitions, the instance of the repeated control information, and decoding the control information based on the received first set of DMRSs and the received second set of DMRSs.

A non-transitory computer-readable medium storing code for wireless communications at a UE is described. The code may include instructions executable by a processor to identify a configuration to use to receive a set of repetitions of control information on a downlink control channel, each repetition of the set of repetitions including one or more symbol periods for an instance of the repeated control information, receive, in a first subset of repetitions of the set of repetitions according to a first set of parameter values of the configuration, a first set of DMRSs for the repeated control information, receive, according to a second set of parameter values of the configuration, a second set of DMRSs for the control information, receive, in each repetition of the set of repetitions, the instance of the repeated control information, and decode the control information based on the received first set of DMRSs and the received second set of DMRSs.

In some examples of the method, apparatuses, and non-transitory computer-readable medium described herein, the first set of parameter values indicates a first quantity of DMRSs per repetition of the first subset of repetitions, the second set of parameters indicating a second quantity of DMRSs per repetition of a second subset of repetitions.

In some examples of the method, apparatuses, and non-transitory computer-readable medium described herein, the first quantity of DMRSs per repetition of the first subset of repetitions may be greater than or equal to the second quantity of DMRSs per repetition of the second subset of repetitions.

In some examples of the method, apparatuses, and non-transitory computer-readable medium described herein, the first quantity of DMRSs per repetition of the first subset of repetitions may be less than the second quantity of DMRSs per repetition of the second subset of repetitions.

Some examples of the method, apparatuses, and non-transitory computer-readable medium described herein may further include operations, features, means, or instructions for identifying the first quantity and the second quantity based on a quantity of repetitions of the set of repetitions, an index of each repetition in the set of repetitions in accordance with a DMRS pattern, or a combination thereof.

In some examples of the method, apparatuses, and non-transitory computer-readable medium described herein, the second subset of repetitions may be located at the beginning of the set of repetitions, the end of the set of repetitions, the middle of the set of repetitions, distributed throughout the set of repetitions, or any combination thereof.

Some examples of the method, apparatuses, and non-transitory computer-readable medium described herein may further include operations, features, means, or instructions for identifying one or more power parameters of the first set of parameter values, the second set of parameter values, or both, the one or more power parameters indicating a first energy power between resource elements (EPRE) ratio associated with the first set of DMRSs and resource elements associated with the first subset of repetitions.

In some examples of the method, apparatuses, and non-transitory computer-readable medium described herein, the one or more power parameters indicate the first EPRE ratio for the first subset of repetitions and a second subset of repetitions of the set of repetitions.

In some examples of the method, apparatuses, and non-transitory computer-readable medium described herein, the one or more power parameters indicate a second EPRE ratio between resource elements associated with the second set of DMRSs and resource elements associated with a second subset of repetitions, the second EPRE ratio different than the first EPRE ratio.

In some examples of the method, apparatuses, and non-transitory computer-readable medium described herein, receiving the second set of DMRSs may include operations, features, means, or instructions for receiving, in a symbol period prior to the set of repetitions, the second set of DMRSs.

In some examples of the method, apparatuses, and non-transitory computer-readable medium described herein, the second set of parameter values indicates resources for the second set of DMRSs.

Some examples of the method, apparatuses, and non-transitory computer-readable medium described herein may further include operations, features, means, or instructions for identifying a first pattern for receiving the first set of DMRSs, the second set of DMRSs, or both, based on the identified configuration, the first pattern indicating resource element locations for receiving one or more DMRSs in each repetition of the set of repetitions.

Some examples of the method, apparatuses, and non-transitory computer-readable medium described herein may further include operations, features, means, or instructions for identifying a second pattern for receiving a third set of DMRSs in a second set of repetitions of the control information based on the identified configuration, the second pattern indicating resource element locations for receiving one or more DMRSs in each repetition of the second set of repetitions.

In some examples of the method, apparatuses, and non-transitory computer-readable medium described herein, the first set of repetitions may be time domain bundled with the second set of repetitions.

In some examples of the method, apparatuses, and non-transitory computer-readable medium described herein, a set of symbol periods corresponding to the set of repetitions, including the one or more symbol periods for each repetition, may be contiguous in a time domain.

Some examples of the method, apparatuses, and non-transitory computer-readable medium described herein may further include operations, features, means, or instructions for receiving a configuration message from a base station, where identifying the configuration may be based on the received configuration message.

A method of wireless communications at a UE is described. The method may include identifying a configuration to use to receive a set of repetitions of control information on a downlink control channel, each repetition of the set of repetitions including one or more symbol periods for an instance of the repeated control information, a first subset of repetitions of the set of repetitions associated with a first type of precoder granularity, and a second subset of repetitions of the set of repetitions associated with a second type of precoder granularity, receiving, in each repetition of the set of repetitions, the instance of the repeated control information on the downlink control channel, and decoding the control information in the first subset of repetitions according to the first type of precoder granularity and the control information in the second subset of repetitions according to the second type of precoder granularity.

An apparatus for wireless communications at a UE is described. The apparatus may include a processor, memory coupled with the processor, and instructions stored in the memory. The instructions may be executable by the processor to cause the apparatus to identify a configuration to use to receive a set of repetitions of control information on a downlink control channel, each repetition of the set of repetitions including one or more symbol periods for an instance of the repeated control information, a first subset of repetitions of the set of repetitions associated with a first type of precoder granularity, and a second subset of repetitions of the set of repetitions associated with a second type of precoder granularity, receive, in each repetition of the set of repetitions, the instance of the repeated control information on the downlink control channel, and decode the control information in the first subset of repetitions according to the first type of precoder granularity and the control information in the second subset of repetitions according to the second type of precoder granularity.

Another apparatus for wireless communications at a UE is described. The apparatus may include means for identifying a configuration to use to receive a set of repetitions of control information on a downlink control channel, each repetition of the set of repetitions including one or more symbol periods for an instance of the repeated control information, a first subset of repetitions of the set of repetitions associated with a first type of precoder granularity, and a second subset of repetitions of the set of repetitions associated with a second type of precoder granularity, receiving, in each repetition of the set of repetitions, the instance of the repeated control information on the downlink control channel, and decoding the control information in the first subset of repetitions according to the first type of precoder granularity and the control information in the second subset of repetitions according to the second type of precoder granularity.

A non-transitory computer-readable medium storing code for wireless communications at a UE is described. The code may include instructions executable by a processor to identify a configuration to use to receive a set of repetitions of control information on a downlink control channel, each repetition of the set of repetitions including one or more symbol periods for an instance of the repeated control information, a first subset of repetitions of the set of repetitions associated with a first type of precoder granularity, and a second subset of repetitions of the set of repetitions associated with a second type of precoder granularity, receive, in each repetition of the set of repetitions, the instance of the repeated control information on the downlink control channel, and decode the control information in the first subset of repetitions according to the first type of precoder granularity and the control information in the second subset of repetitions according to the second type of precoder granularity.

Some examples of the method, apparatuses, and non-transitory computer-readable medium described herein may further include operations, features, means, or instructions for determining that a first repetition of the set of repetitions may be associated with the first type of precoder granularity, the first subset of repetitions including the first repetition.

In some examples of the method, apparatuses, and non-transitory computer-readable medium described herein, the first repetition includes an initial repetition of the set of repetitions.

Some examples of the method, apparatuses, and non-transitory computer-readable medium described herein may further include operations, features, means, or instructions for determining that a remainder of the set of repetitions may be associated with the second type of precoder granularity, the second subset of repetitions including the remainder of the set of repetitions.

In some examples of the method, apparatuses, and non-transitory computer-readable medium described herein, the first subset of repetitions includes a set of repetitions associated with the first type of precoder granularity and the second subset of repetitions includes a set of repetitions associated with the second type of precoder granularity.

In some examples of the method, apparatuses, and non-transitory computer-readable medium described herein, the first type of precoder granularity indicates a size of frequency resources associated with each of a set of contiguous resource blocks, where the second type of precoder granularity indicates a size of frequency resources associated with a resource element group bundle.

A method of wireless communications at a base station is described. The method may include identifying a configuration to use to transmit a set of repetitions of control information on a downlink control channel, each repetition of the set of repetitions including one or more symbol periods for an instance of the repeated control information, transmitting, in a first subset of repetitions of the set of repetitions according to a first set of parameter values of the configuration, a first set of DMRSs for the repeated control information, transmitting, according to a second set of parameter values of the configuration, a second set of DMRSs for the control information, and transmitting, in each repetition of the set of repetitions, the instance of the control information.

An apparatus for wireless communications at a base station is described. The apparatus may include a processor, memory coupled with the processor, and instructions stored in the memory. The instructions may be executable by the processor to cause the apparatus to identify a configuration to use to transmit a set of repetitions of control information on a downlink control channel, each repetition of the set of repetitions including one or more symbol periods for an instance of the repeated control information, transmit, in a first subset of repetitions of the set of repetitions according to a first set of parameter values of the configuration, a first set of DMRSs for the repeated control information, transmit, according to a second set of parameter values of the configuration, a second set of DMRSs for the control information, and transmit, in each repetition of the set of repetitions, the instance of the control information.

Another apparatus for wireless communications at a base station is described. The apparatus may include means for identifying a configuration to use to transmit a set of repetitions of control information on a downlink control channel, each repetition of the set of repetitions including one or more symbol periods for an instance of the repeated control information, transmitting, in a first subset of repetitions of the set of repetitions according to a first set of parameter values of the configuration, a first set of DMRSs for the repeated control information, transmitting, according to a second set of parameter values of the configuration, a second set of DMRSs for the control information, and transmitting, in each repetition of the set of repetitions, the instance of the control information.

A non-transitory computer-readable medium storing code for wireless communications at a base station is described. The code may include instructions executable by a processor to identify a configuration to use to transmit a set of repetitions of control information on a downlink control channel, each repetition of the set of repetitions including one or more symbol periods for an instance of the repeated control information, transmit, in a first subset of repetitions of the set of repetitions according to a first set of parameter values of the configuration, a first set of DMRSs for the repeated control information, transmit, according to a second set of parameter values of the configuration, a second set of DMRSs for the control information, and transmit, in each repetition of the set of repetitions, the instance of the control information.

In some examples of the method, apparatuses, and non-transitory computer-readable medium described herein, the first set of parameter values indicates a first quantity of DMRSs per repetition of the first subset of repetitions, the second set of parameters indicating a second quantity of DMRSs per repetition of a second subset of repetitions of the set of repetitions.

In some examples of the method, apparatuses, and non-transitory computer-readable medium described herein, the first quantity of DMRSs per repetition of the first subset of repetitions may be greater than or equal to the second quantity of DMRSs per repetition of the second subset of repetitions.

In some examples of the method, apparatuses, and non-transitory computer-readable medium described herein, the first quantity of DMRSs per repetition of the first subset of repetitions may be less than the second quantity of DMRSs per repetition of the second subset of repetitions.

Some examples of the method, apparatuses, and non-transitory computer-readable medium described herein may further include operations, features, means, or instructions for identifying the first quantity and the second quantity based on a quantity of repetitions of the set of repetitions, an index of each repetition in the set of repetitions in accordance with a DMRS pattern, or a combination thereof.

In some examples of the method, apparatuses, and non-transitory computer-readable medium described herein, the second subset of repetitions may be located at the beginning of the set of repetitions, the end of the set of repetitions, the middle of the set of repetitions, distributed throughout the set of repetitions, or any combination thereof.

Some examples of the method, apparatuses, and non-transitory computer-readable medium described herein may further include operations, features, means, or instructions for identifying one or more power parameters of the first set of parameter values, the second set of parameter values, or both, the one or more power parameters indicating a first energy power allocated to a resource element (EPRE) ratio between resource elements associated with the first set of DMRSs and resource elements associated with the first subset of repetitions, and transmitting the first set of DMRSs, the second set of DMRSs, and the instances of the control information in accordance with the one or more power parameters.

In some examples of the method, apparatuses, and non-transitory computer-readable medium described herein, the one or more power parameters indicate the first EPRE ratio for the first subset of repetitions and a second subset of repetitions of the set of repetitions.

In some examples of the method, apparatuses, and non-transitory computer-readable medium described herein, the one or more power parameters indicate a second EPRE ratio between resource elements associated with the second set of DMRSs and resource elements associated with a second subset of repetitions of the set of repetitions, the second EPRE ratio different than the first EPRE ratio.

In some examples of the method, apparatuses, and non-transitory computer-readable medium described herein, transmitting the second set of DMRSs may include operations, features, means, or instructions for transmitting, in a symbol period prior to the set of repetitions, the second set of DMRSs.

In some examples of the method, apparatuses, and non-transitory computer-readable medium described herein, the second set of parameter values indicates the resources for the second set of DMRSs.

Some examples of the method, apparatuses, and non-transitory computer-readable medium described herein may further include operations, features, means, or instructions for identifying a first pattern for transmitting the first set of DMRSs, the second set of DMRSs, or both, based on the identified configuration, the first pattern indicating resource element locations for transmitting one or more DMRSs in each repetition of the set of repetitions.

Some examples of the method, apparatuses, and non-transitory computer-readable medium described herein may further include operations, features, means, or instructions for identifying a second pattern for transmitting a third set of DMRSs in a second set of repetitions of the control information based on the identified configuration, the second pattern indicating resource element locations for transmitting one or more DMRSs in each repetition of the second set of repetitions.

In some examples of the method, apparatuses, and non-transitory computer-readable medium described herein, the first set of repetitions may be time domain bundled with the second set of repetitions.

In some examples of the method, apparatuses, and non-transitory computer-readable medium described herein, a set of symbol periods corresponding to the set of repetitions, including the one or more symbol periods for each repetition, may be contiguous in a time domain.

Some examples of the method, apparatuses, and non-transitory computer-readable medium described herein may further include operations, features, means, or instructions for transmitting a configuration message to a UE, the configuration message indicating the first set of parameter values and the second set of parameter values.

A method of wireless communications at a base station is described. The method may include identifying a configuration to use to transmit a set of repetitions of control information on a downlink control channel, each repetition of the set of repetitions including one or more symbol periods for an instance of the repeated control information, precoding a first subset of repetitions of the set of repetitions according to a first type of precoder granularity, precoding a second subset of repetitions of the set of repetitions according to a second type of precoder granularity, and transmitting, to a UE, the set of repetitions of the control information, including the first subset of repetitions and the second subset of repetitions.

An apparatus for wireless communications at a base station is described. The apparatus may include a processor, memory coupled with the processor, and instructions stored in the memory. The instructions may be executable by the processor to cause the apparatus to identify a configuration to use to transmit a set of repetitions of control information on a downlink control channel, each repetition of the set of repetitions including one or more symbol periods for an instance of the repeated control information, precode a first subset of repetitions of the set of repetitions according to a first type of precoder granularity, precode a second subset of repetitions of the set of repetitions according to a second type of precoder granularity, and transmit, to a UE, the set of repetitions of the control information, including the first subset of repetitions and the second subset of repetitions.

Another apparatus for wireless communications at a base station is described. The apparatus may include means for identifying a configuration to use to transmit a set of repetitions of control information on a downlink control channel, each repetition of the set of repetitions including one or more symbol periods for an instance of the repeated control information, precoding a first subset of repetitions of the set of repetitions according to a first type of precoder granularity, precoding a second subset of repetitions of the set of repetitions according to a second type of precoder granularity, and transmitting, to a UE, the set of repetitions of the control information, including the first subset of repetitions and the second subset of repetitions.

A non-transitory computer-readable medium storing code for wireless communications at a base station is described. The code may include instructions executable by a processor to identify a configuration to use to transmit a set of repetitions of control information on a downlink control channel, each repetition of the set of repetitions including one or more symbol periods for an instance of the repeated control information, precode a first subset of repetitions of the set of repetitions according to a first type of precoder granularity, precode a second subset of repetitions of the set of repetitions according to a second type of precoder granularity, and transmit, to a UE, the set of repetitions of the control information, including the first subset of repetitions and the second subset of repetitions.

Some examples of the method, apparatuses, and non-transitory computer-readable medium described herein may further include operations, features, means, or instructions for determining that a first repetition of the set of repetitions may be associated with the first type of precoder granularity, the first subset of repetitions including the first repetition.

In some examples of the method, apparatuses, and non-transitory computer-readable medium described herein, the first repetition includes an initial repetition of the set of repetitions.

Some examples of the method, apparatuses, and non-transitory computer-readable medium described herein may further include operations, features, means, or instructions for determining that a remainder of the set of repetitions may be associated with the second type of precoder granularity, the second subset of repetitions including the remainder of the set of repetitions.

In some examples of the method, apparatuses, and non-transitory computer-readable medium described herein, the first subset of repetitions includes a set of repetitions associated with the first type of precoder granularity and the second subset of repetitions includes a set of repetitions associated with the second type of precoder granularity.

In some examples of the method, apparatuses, and non-transitory computer-readable medium described herein, the first type of precoder granularity indicates a size of frequency resources associated with each of a set of contiguous resource blocks, where the second type of precoder granularity indicates a size of frequency resources associated with a resource element group bundle.

BRIEF DESCRIPTION OF THE DRAWINGS

FIG. 2 illustrates an example of a wireless communications system that supports DMRS enhancements for control channel repetitions in accordance with aspects of the present disclosure.

FIGS. 3 through 8 illustrate examples of DMRS schemes that support DMRS enhancements for control channel repetitions in accordance with aspects of the present disclosure.

FIGS. 10 and 11 show block diagrams of devices that support DMRS enhancements for control channel repetitions in accordance with aspects of the present disclosure.

FIGS. 18 through 21 show flowcharts illustrating methods that support DMRS enhancements for control channel repetitions in accordance with aspects of the present disclosure.

DETAILED DESCRIPTION

Figure 1:
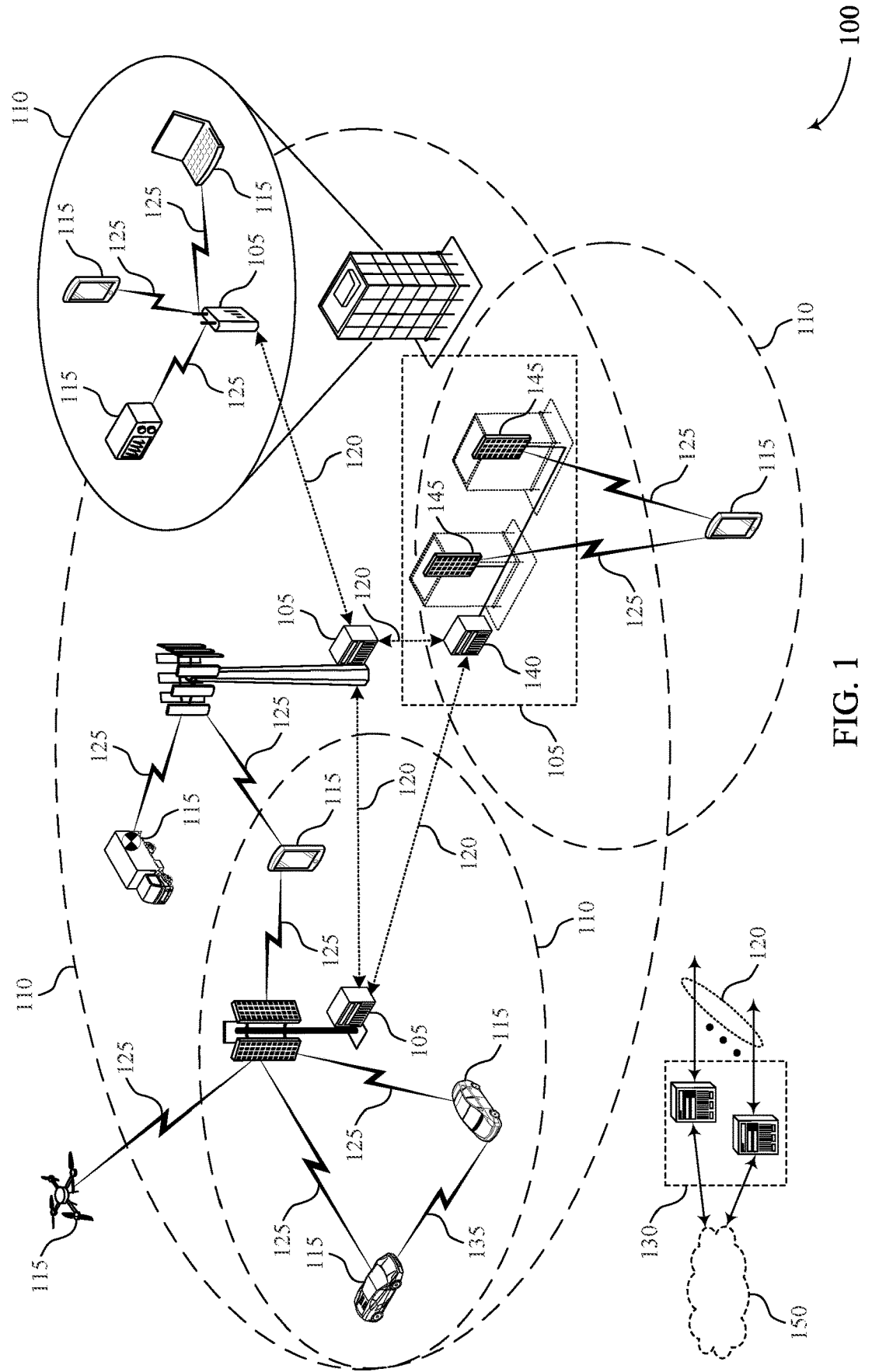
FIG. 1 illustrates an example of a system for wireless communications that supports demodulation reference signal (DMRS) enhancements for control channel repetitions in accordance with aspects of the present disclosure.

A base station and a user equipment (UE) may communicate information in a wireless communications system. For example, the base station may transmit downlink control information (DCI) to the UE via a downlink control channel (e.g., a physical downlink control channel (PDCCH), data to the UE via a downlink shared channel (e.g., a physical downlink shared channel (PDSCH)), etc. In some examples, a wireless device (e.g., the base station or the UE) may transmit one or more reference signals. For example, the base station may transmit demodulation reference signals (DMRSs) to the UE over a downlink channel, which may enable the UE to perform channel estimation techniques. Such channel estimation techniques may improve decoding and/or demodulation of data (e.g., control information such as DCI) transmitted via the channel. However, in some cases the communications in the system may be relatively inefficient. For example, an error rate may be relatively high for decoding PDCCH transmissions, for example, if a UE uses a relatively small quantity of antennas (e.g., the UE may be an example of a reduced capability New Radio (NR) UE, among other examples).

According to the techniques described herein, a wireless device may implement one or more DMRS enhancements for control channel repetitions, which may result in improved performance and communication efficiency. For example, a UE or a base station may identify a configuration to use to receive or transmit a set of repetitions of control information on a downlink control channel (e.g., a set of PDCCH repetitions). Such repetitions of control information may increase coverage and reduce communication errors (e.g., in order to compensate for coverage loss due to a UE having a relatively small quantity of antennas). In some examples, the base station may signal the configuration to the UE via radio resource control (RRC) signaling, among other examples of signaling.

The configuration may include parameters values in accordance with one or more DMRS schemes. For example, the configuration may indicate a first set of parameter values for receiving a first set of DMRS transmissions. Additionally or alternatively, the configuration may indicate a second set of parameter values for receiving a second set of DMRS transmissions. The base station may transmit instances of the control information in one or more symbol periods. For example, the base station may transmit a set of repetitions of control information using a control resource set (CORESET), such as a one symbol CORESET, a two symbol CORESET, etc. The UE may receive the instances of control information during the set of repetitions.

In some examples, the configuration may indicate a first type of precoder granularity associated with a first subset of the repetitions and/or a second type of precoder granularity associated with a second subset of the repetitions. In such examples, the UE may decode the control information in the first subset of repetitions according to the first type of precoder granularity and decode the control information in the second subset of repetitions according to the second type of precoder granularity. In some examples, one of the repetitions may correspond to the first type of precoder granularity (e.g., the initial repetition of the set of repetitions) and the remaining repetitions may correspond to the second type of precoder granularity. In some other examples, a plurality of the repetitions may correspond to the first type of precoder granularity and a plurality of the repetitions may correspond to the second type of precoder granularity.

The UE may receive the first set of DMRS transmissions in accordance with the first set of parameter values, the second set of DMRS transmissions in accordance with the second set of parameter values, etc. The UE may decode the control information based at least in part on receiving the first set of DMRS transmissions and the second set of DMRS transmissions. For example, the UE may perform a channel estimation procedure using the DMRS transmissions. Such a channel estimation procedure may improve decoding and/or demodulation of the control information.

In some examples, the parameter values may indicate a DMRS density for receiving one or more DMRS transmissions (e.g., the first set of parameter values may indicate a first quantity of DMRS transmissions per repetition of the first subset of the repetitions, the second set of parameter values may indicate a second quantity of DMRS transmissions per repetition of the second subset of the repetitions, etc.). Additionally or alternatively, the parameter values may include one or more power parameters (e.g., power parameters indicating an energy power ratio between DMRS resource elements and control information resource elements). Additionally or alternatively, the parameter values may indicate a dedicated DMRS symbol prior to the set of repetitions of the control information (e.g., the parameter values may indicate time frequency resources prior to the repetitions for receiving the second set of DMRS transmissions). In some examples, the parameter values may indicate a pattern for receiving the first set of DMRS transmissions and/or the second set of DMRS transmissions (e.g., the parameter values may indicate different resources for receiving the DMRS transmissions in different repetitions). In some examples, the parameter values may indicate a second pattern for receiving a third set of DMRS transmissions in a second set of repetitions. In some such examples, the first set of repetitions may be time domain (TD) bundled with at least a portion of the second set of repetitions.

Aspects of the disclosure are initially described in the context of wireless communications systems. Aspects of the disclosure are also described in the context of DMRS schemes and process flows. Aspects of the disclosure are further illustrated by and described with reference to apparatus diagrams, system diagrams, and flowcharts that relate to demodulation reference signal enhancements for control channel repetitions.

FIG. 1 illustrates an example of a wireless communications system 100 that supports demodulation reference signal enhancements for control channel repetitions in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 and a UE 115 may communicate information in the wireless communications system 100. For example, the base station 105 may transmit DCI to the UE 115 via a downlink control channel (e.g., a PDCCH), data to the UE 115 via a downlink shared channel (e.g., a PDSCH), etc. In some examples, a wireless device (e.g., the base station 105 or the UE 115) may transmit one or more reference signals. For example, the base station 105 may transmit demodulation reference signals (DMRSs) to the UE 115 over a downlink channel, which may enable the UE 115 to perform channel estimation techniques. Such channel estimation techniques may improve decoding and/or demodulation of data (e.g., control information such as DCI) transmitted via the channel. However, in some cases the communications in the system may be relatively inefficient. For example, an error rate may be relatively high for decoding PDCCH transmissions, for example, if a UE 115 uses a relatively small quantity of antennas (e.g., the UE 115 may be an example of a reduced capability NR UE 115, among other examples).

In accordance with the techniques described herein, a wireless device may implement one or more DMRS enhancements for control channel repetitions, which may result in improved performance and communication efficiency in the wireless communications system 100. For example, a UE 115 or a base station 105 may identify a configuration to use to receive or transmit a set of repetitions of control information on a downlink control channel (e.g., a set of PDCCH repetitions). Such repetitions of control information may increase coverage and reduce communication errors (e.g., in order to compensate for coverage loss due to a UE 115 having a relatively small quantity of antennas). In some examples, the base station 105 may signal the configuration to the UE 115 via RRC signaling, among other examples of signaling.

The configuration may include parameters values in accordance with one or more DMRS schemes. For example, the configuration may indicate a first set of parameter values for receiving a first set of DMRS transmissions. Additionally or alternatively, the configuration may indicate a second set of parameter values for receiving a second set of DMRS transmissions. The base station 105 may transmit instances of the control information in one or more symbol periods. For example, the base station 105 may transmit a set of repetitions of control information using a CORESET, such as a one symbol CORESET, a two symbol CORESET, etc. The UE 115 may receive and decode the instances of control information during the set of repetitions.

In some examples, the configuration may indicate a first type of precoder granularity associated with a first subset of the repetitions and/or a second type of precoder granularity associated with a second subset of the repetitions. In such examples, the UE 115 may decode the control information in the first subset of repetitions according to the first type of precoder granularity and decode the control information in the second subset of repetitions according to the second type of precoder granularity. In some examples, one of the repetitions may correspond to the first type of precoder granularity (e.g., the initial repetition of the set of repetitions) and the remaining repetitions may correspond to the second type of precoder granularity. In some other examples, a plurality of the repetitions may correspond to the first type of precoder granularity and a plurality of the repetitions may correspond to the second type of precoder granularity.

The UE 115 may receive the first set of DMRS transmissions in accordance with the first set of parameter values, the second set of DMRS transmissions in accordance with the second set of parameter values, etc. The UE 115 may decode the control information based at least in part on receiving the first set of DMRS transmissions and the second set of DMRS transmissions. For example, the UE 115 may perform a channel estimation procedure using the DMRS transmissions. Such a channel estimation procedure may improve decoding and/or demodulation of the control information.

In some examples, the parameter values may indicate a DMRS density for receiving one or more DMRS transmissions (e.g., the first set of parameter values may indicate a first quantity of DMRS transmissions per repetition of the first subset of the repetitions, the second set of parameter values may indicate a second quantity of DMRS transmissions per repetition of the second subset of the repetitions, etc.). Additionally or alternatively, the parameter values may include one or more power parameters (e.g., power parameters indicating an energy power ratio between DMRS resource elements and control information resource elements). Additionally or alternatively, the parameter values may indicate a dedicated DMRS symbol prior to the set of repetitions of the control information (e.g., the parameter values may indicate time frequency resources prior to the repetitions for receiving the second set of DMRS transmissions). In some examples, the parameter values may indicate a pattern for receiving the first set of DMRS transmissions and/or the second set of DMRS transmissions (e.g., the parameter values may indicate different resources for receiving the DMRS transmissions in different repetitions). In some examples, the parameter values may indicate a second pattern for receiving a third set of DMRS transmissions in a second set of repetitions. In some such examples, the first set of repetitions may be TD bundled with at least a portion of the second set of repetitions.

FIG. 2 illustrates an example of a wireless communications system 200 that supports demodulation reference signal enhancements for control channel repetitions in accordance with aspects of the present disclosure. In some examples, wireless communications system 200 may implement aspects of wireless communications system 100 and may include a base station 105-*a* and a UE 115-*a*, which may be examples of a base station 105 and a UE 115 as described with reference to FIG. 1.

The base station 105-*a* and the UE 115-*a* may communicate within the coverage area 110-*a*. For example, the base station 105-*a* may transmit control information 220 (e.g., DCI, repetitions of DCI, etc.) via a downlink channel (e.g., PDCCH). Additionally or alternatively, the base station 105-*a* may transmit one or more DMRSs 225 to the UE 115-*a*. The UE 115-*a* may perform a channel estimation procedure based on the received DMRSs 225. For example, the UE 115-*a* may estimate channel conditions using the DMRSs 225, which may improve decoding and/or demodulation of the control information 220. In some examples, the various DMRSs 225 may be bundled (e.g., TD bundled). For example, the base station 105-*a* may transmit multiple, redundant versions of a same set of DMRSs to the UE 115-*a* in one or more transmission time intervals (TTIs). Such DMRS bundling may reduce transmission delays and reduce overhead, as well as improve channel estimation.

In some examples, the UE 115-*a* may have a relatively low quantity of reception antennas available for use. For example, the UE 115-*a* may be an example of a reduced capability UE 115 (e.g., a smart wearable device, an industrial sensor, a video surveillance device, among other examples of NR-light devices). Additionally or alternatively, the UE 115-*a* may be experiencing relatively poor coverage. The wireless communications system 200 may implement repetitions of data, for example, to compensate for coverage loss. For example, the base station 105-*a* may transmit PDCCH and/or PDSCH repetitions to compensate for coverage loss in downlink due to a reduced quantity of reception antennas resulting in a relatively poor reception diversity at the UE 115-*a*.

In accordance with the techniques described herein, a wireless device may implement one or more DMRS enhancements for control channel repetitions, which may result in improved performance (e.g., improved channel estimation performance) and communication efficiency (e.g., reduced code block (CB) error rate) in the wireless communications system 200. For example, the UE 115-*a* or the base station 105-*a* may identify a configuration to use to receive or transmit a set of repetitions of control information on a downlink control channel (e.g., a set of PDCCH repetitions). Such repetitions of control information may increase coverage and reduce communication errors (e.g., in order to compensate for coverage loss due to a UE 115-*a* having a relatively small quantity of antennas). In some examples, the base station 105-*a* may signal the configuration to the UE 115-*a* via RRC signaling, among other examples of signaling.

The configuration may include parameters values in accordance with one or more DMRS schemes. For example, the configuration may indicate a first set of parameter values for receiving a first set of DMRS transmissions. Additionally or alternatively, the configuration may indicate a second set of parameter values for receiving a second set of DMRS transmissions. The base station 105-*a* may transmit instances of the control information in one or more symbol periods. For example, the base station 105-*a* may transmit a set of repetitions of control information using a CORESET, such as a one symbol CORESET, a two symbol CORESET, etc. The UE 115-*a* may receive and decode the instances of control information during the set of repetitions.

In some examples, the configuration may indicate a first type of precoder granularity associated with a first subset of the repetitions and/or a second type of precoder granularity associated with a second subset of the repetitions. In such examples, the UE 115-*a* may decode the control information in the first subset of repetitions according to the first type of precoder granularity and decode the control information in the second subset of repetitions according to the second type of precoder granularity. In some examples, one of the repetitions may correspond to the first type of precoder granularity (e.g., the initial repetition of the set of repetitions) and the remaining repetitions may correspond to the second type of precoder granularity. In some other examples, a plurality of the repetitions may correspond to the first type of precoder granularity and a plurality of the repetitions may correspond to the second type of precoder granularity.

In some examples, a CORESET may be configured with the first type of precoder granularity by a parameter value indicating a size of frequency resources associated with each of a set of contiguous resource blocks (e.g., PRG=allContiguousRBs) and/or the second type of precoder granularity by a parameter value indicating a size of frequency resources associated with a resource element group bundle (e.g., PRG=sameAsREG-Bundle). In some examples, a wireless device (e.g., a UE) may be configured with one or more precoder schemes. A first precoder scheme may use the first type of precoder granularity (e.g., PRG=allContiguousRBs) for an initial PDCCH transmission and the second type of precoder granularity (e.g., PRG=sameAsREG-Bundle) for re-transmissions of the PDCCH transmission (PDCCH repetitions). A second precoder scheme may use the first type of precoder granularity (e.g., PRG=allContiguousRBs) for one of the retransmissions (e.g., one of a set of data repetitions) and the second type of precoder granularity (e.g., PRG=sameAsREG-Bundle) for the remaining retransmissions of control information. Additionally or alternatively, the second precoder scheme may use the first type of precoder granularity (e.g., PRG=allContiguousRBs) for several of the retransmissions (e.g., a first subset of a set of data repetitions) and the second type of precoder granularity (e.g., PRG=sameAsREG-Bundle) for the remaining retransmissions (e.g., a second subset of the set of data repetitions). In some examples, the wireless device may configure some of the transmissions or retransmissions with the second type of precoder granularity (e.g., PRG=sameAsREG-Bundle) which may reduce an impact on UE-specific PDCCH and/or PDSCH scheduling, for example, when a base station is co-scheduling other UEs. Such configuration may improve communication efficiency.

The UE 115-*a* may receive the first set of DMRS transmissions in accordance with the first set of parameter values, the second set of DMRS transmissions in accordance with the second set of parameter values, etc. The UE 115-*a* may decode the control information based at least in part on receiving the first set of DMRS transmissions and the second set of DMRS transmissions. For example, the UE 115-*a* may perform a channel estimation procedure using the DMRS transmissions. Such a channel estimation procedure may improve decoding and/or demodulation of the control information.

In some examples, the parameter values may indicate a DMRS density for receiving one or more DMRS transmissions (e.g., the first set of parameter values may indicate a first quantity of DMRS transmissions per repetition of the first subset of the repetitions, the second set of parameter values may indicate a second quantity of DMRS transmissions per repetition of the second subset of the repetitions, etc.). Additionally or alternatively, the parameter values may include one or more power parameters (e.g., power parameters indicating an energy power ratio between DMRS resource elements and control information resource elements). Additionally or alternatively, the parameter values may indicate a dedicated DMRS symbol prior to the set of repetitions of the control information (e.g., the parameter values may indicate time frequency resources prior to the repetitions for receiving the second set of DMRS transmissions). In some examples, the parameter values may indicate a pattern for receiving the first set of DMRS transmissions and/or the second set of DMRS transmissions (e.g., the parameter values may indicate different resources for receiving the DMRS transmissions in different repetitions). In some examples, the parameter values may indicate a second pattern for receiving a third set of DMRS transmissions in a second set of repetitions. In some such examples, the first set of repetitions may be TD bundled with at least a portion of the second set of repetitions.

FIG. 3 illustrates an example of a DMRS scheme 300 that supports demodulation reference signal enhancements for control channel repetitions in accordance with aspects of the present disclosure. In some examples, the DMRS scheme 300 may be implemented by, or related to, aspects of wireless communications systems 100 or 200. For example, a base station 105 or a UE 115 may implement the DMRS scheme 300.

The DMRS scheme 300 may illustrate an example of a resource block in a two symbol CORESET (e.g., the resource block may be allocated to two OFDM symbols and frequency resources corresponding to a PDCCH). The resource block may be an example of resources allocated for a repetition of data, such as control information. Instances of the control information may be transmitted via the data resources 310 of the resource block. DMRSs may be transmitted via the DMRS resources 305.

As illustrated, the DMRS density for the PDCCH may be 25 percent. For example, in an OFDM symbol of the resource block, there may be one resource element allocated as DMRS resources 305 for every four resource elements (e.g., the remaining three resource elements of the OFDM symbol period may be allocated as data resources 310 for transmission and/or re-transmission of the control information).

A wireless device (e.g., a base station 105 and/or a UE 115) may identify a configuration to use to receive or transmit a set of repetitions 315 of control information using the data resources 310. Such repetitions 315 of control information may increase coverage and reduce communication errors (e.g., in order to compensate for coverage loss due to a UE 115 having a relatively small quantity of antennas). In some examples, the base station 105 may signal the configuration to the UE 115 via RRC signaling, among other examples of signaling.

The configuration may indicate one or more parameters for receiving DMRSs via the DMRS resources 305 and repetitions 315 of control information via the data resources 310. For example, the one or more parameters may indicate the DMRS density illustrated in the DMRS scheme 300 (e.g., 25% density), among other examples of densities. Additionally or alternatively, the one or more parameters may include one or more power parameters (e.g., power parameters indicating an energy power ratio between DMRS resources 305 and data resources 310). Additionally or alternatively, the parameters may indicate a dedicated DMRS symbol for receiving DMRSs (e.g., the parameters may indicate an OFDM symbol period prior to the resource block illustrated by the DMRS scheme 300). In some examples, the parameters may indicate a pattern for receiving the DMRSs (e.g., the parameters may indicate different DMRS resources 305 for receiving the DMRSs within the repetition 315, within different repetitions 315, or both).

Figure 4:
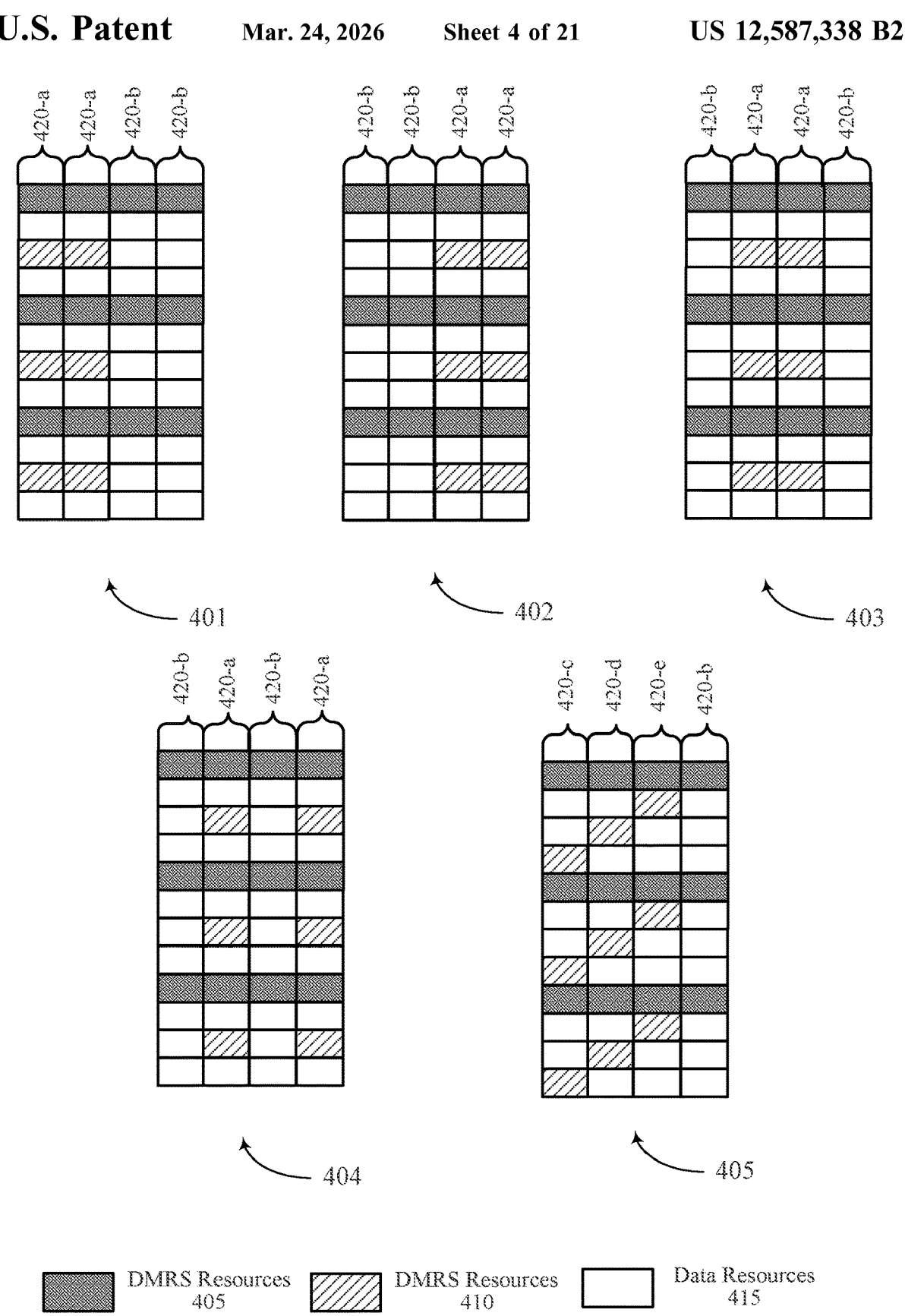

FIG. 4 may illustrate examples of DMRS schemes 401, 402, 403, 404, and 405 that support demodulation reference signal enhancements for control channel repetitions in accordance with aspects of the present disclosure. In some examples, the various DMRS schemes may be implemented by, or related to, aspects of wireless communications systems 100 or 200. For example, a base station 105 or a UE 115 may implement one or more of the DMRS schemes for control channel repetitions 420 (e.g., PDCCH repetitions). Generally, the DMRS schemes may illustrate examples of using higher DMRS density repetitions 420 in a set of repetitions 420.

A wireless device (e.g., a base station 105 and/or a UE 115) may identify a configuration to use to receive or transmit. In some examples, the wireless device may identify one or more parameter values of the configuration (e.g., the wireless device may be configured with the parameter values via RRC signaling, among other examples of signaling). The wireless device may receive DMRSs via the DMRS resources 405 (e.g., a first set of DMRSs), the DMRS resources 410 (e.g., a second set of DMRSs), or both, based on the parameter values. The wireless device may receive repetitions of control information via the data resources 415 illustrated in the DMRS scheme 400.

The various DMRS schemes may illustrate examples of transmitting a set of repetitions (e.g., a set of repetitions 420). For example, the DMRS scheme 401 may illustrate an example of four repetitions 420 with two relatively higher density repetitions 420-*a* and two relatively lower density repetitions 420-*b*. The DMRS schemes may illustrate examples of transmitting the different density repetitions 420 at the beginning (e.g., DMRS scheme 401), end (e.g., DMRS scheme 402), middle (e.g., DMRS scheme 403), distributed throughout (e.g., DMRS scheme 404), and implemented in various patterns (e.g., DMRS scheme 405 with repetitions 420-*c*, 420-*d*, 420-*e*, and 420-*b*), although it is to be understood that other implementations may be used.

The wireless device may identify one or more DMRS densities based at least in part on the one or more parameter values. For example, the one or more parameter values may indicate a DMRS density for one or more repetitions 420 in a set of repetitions 420. The DMRS density may be a quantity of DMRS resources 410 (e.g., resource elements allocated for receiving or transmitting DMRSs) per repetition 420 of a set of repetitions 420. As an illustrative example, the one or more parameters may indicate a DMRS density of 50% for the repetition 420-*a* (e.g., one resource element in every two resource elements of the repetition 420-*a* may be allocated for DMRSs) and a DMRS density of 25% for the repetition 420-*b* (e.g., one resource element in every four resource elements of the repetition 420-*b* may be allocated for DMRSs). In some examples, any DMRS density may be implemented for one or more of the repetitions 420 (e.g., 0% density to 100% density).

The one or more parameter values may enable the wireless device to implement relatively higher DMRS density in some or all of the repetitions 420 (e.g., a higher DMRS density compared to the DMRS scheme 300). Such higher DMRS density may result in more accurate channel estimation, improved decoding and/or demodulation of control information, etc. For illustrative clarity, the repetitions 420 that include a relatively higher DMRS density include both DMRS resources 405 and additional DMRS resources 410.

Although illustrated as each repetition 420 being associated with a one OFDM symbol CORESET and a set of repetitions 420 including four repetitions 420, it is to be understood that any CORESET and/or size of a set of repetitions 420 may be used. For example, the CORESET associated with a repetition 420 may include a set of OFDM symbols (e.g., a two symbol CORESET). In some examples, each OFDM symbol of the CORESET may be configured with a same DMRS density (e.g., a same higher DMRS density including DMRS resources 405 and additional DMRS resources 410). In some other examples, a portion of the OFDM symbols may be configured with a first DMRS density and a portion of the OFDM symbols may be configured with a second DMRS density (e.g., one symbol of a two symbol CORESET may correspond to a higher DMRS density than a second symbol of the two symbol CORESET).

The DMRS schemes may illustrate multiple examples of implementing higher DMRS density in a portion of a set of repetitions. For example, the DMRS scheme 400 may include examples of higher DMRS density repetitions 420 located in the front, end, middle, or distributed throughout each set of repetitions 420. In other words, the location of two additional DMRS resources 410 are located within a set of repetitions 420 in accordance with one or more parameter values (e.g., in the first two repetitions 420, the last two repetitions 420, in the middle two repetitions, or distributed throughout the set of repetitions 420, among other examples of densities, quantities of DMRS resources 410, etc.). In some examples, all of the repetitions 420 in a control channel may be configured to have the same DMRS density (e.g., the same higher DMRS density or the same lower DMRS density).

The wireless device may implement one or more rules (e.g., indicated by the one or more parameter values, pre-configured at the wireless device, or a combination thereof). The wireless device may identify a DMRS density in accordance with the one or more rules. As an illustrative example, a DMRS density X may be used for a set of N repetitions 420, where X is dependent on the value of N (e.g., X=25% for N=1 or 2, X=50% for N>2, among other examples). Additionally or alternatively, the wireless device may implement different DMRS densities in N repetitions 420 (e.g., a first half of the N repetitions 420, N/2, may have a first DMRS density and a second half of the N repetitions 420, N/2, may have a second DMRS density). In some examples, the wireless device may determine DMRS densities (e.g., a first quantity of DMRSs per repetition and/or a second quantity of DMRSs per repetition) based on an index of a repetition. For example, If the index N of a repetition 420 lies within the first half of N repetitions 420 (e.g., N/2), the wireless device may implement a first density for that repetition 420, among other examples of using the one or more rules to identify a DMRS density for a given index.

In some examples, the additional DMRS resources 410 may be configured in a DMRS pattern, as illustrated with reference to the DMRS scheme 405. For example, the wireless device may puncture different resource elements in different repetitions 420 (e.g., the additional DMRS resources 410 may be allocated to a different frequency resource element in the repetition 420-c compared to the additional DMRS resources 410 in the repetitions 420-d). In some examples, the DMRS density pattern across slots may be reset at the beginning of each slot (e.g., slot-common DMRS density pattern indicated by the one or more parameter values of the configuration).

In some examples, the higher DMRS density repetitions 420 may be based on puncturing techniques and/or rate matching techniques. For example, a wireless device may puncture some resource elements corresponding to the data resources 415 (e.g., resource elements carrying a PDCCH payload prior to puncturing). In some examples, different resource elements may be punctured (e.g., if multiple PDCCH repetitions include a higher DMRS density). As another example, a wireless device may rate match during channel encoding to allocate the available quantity of resource elements for a control channel payload. For example, a rate matching output E may be determined based on a relatively lower DMRS density (e.g., a pre-configured density of 25%) and a first portion (E') of the E bits after rate matching may be mapped to the available quantity of resource elements. In such examples, implementing the higher DMRS density may refrain from changing the polar coding for the PDCCH.

In some examples, the wireless device may generate the DMRS sequence in higher density repetitions 420 (e.g., symbol periods) based at least in part on a DMRS sequence in lower density repetitions 420 (e.g., based on a legacy DMRS sequence). For example, the wireless device may perform phase shifting or spreading to the lower density DMRS sequences. As an illustrative example, the wireless device may implement the equation w(m)=w_legacy(n)*g (k), where m=K*n+k and g(k) may be a predefined phase shifting or spreading sequence (e.g., w(m) may represent the DMRS sequence for a repetition 420 with a higher DMRS density and w_legacy(n) may represent the DMRS sequence for a repetition 420 with a legacy DMRS sequence). In some examples, implementing the phase shifting and/or spreading techniques may enable backwards capability in the wireless communications system.

Figure 5:
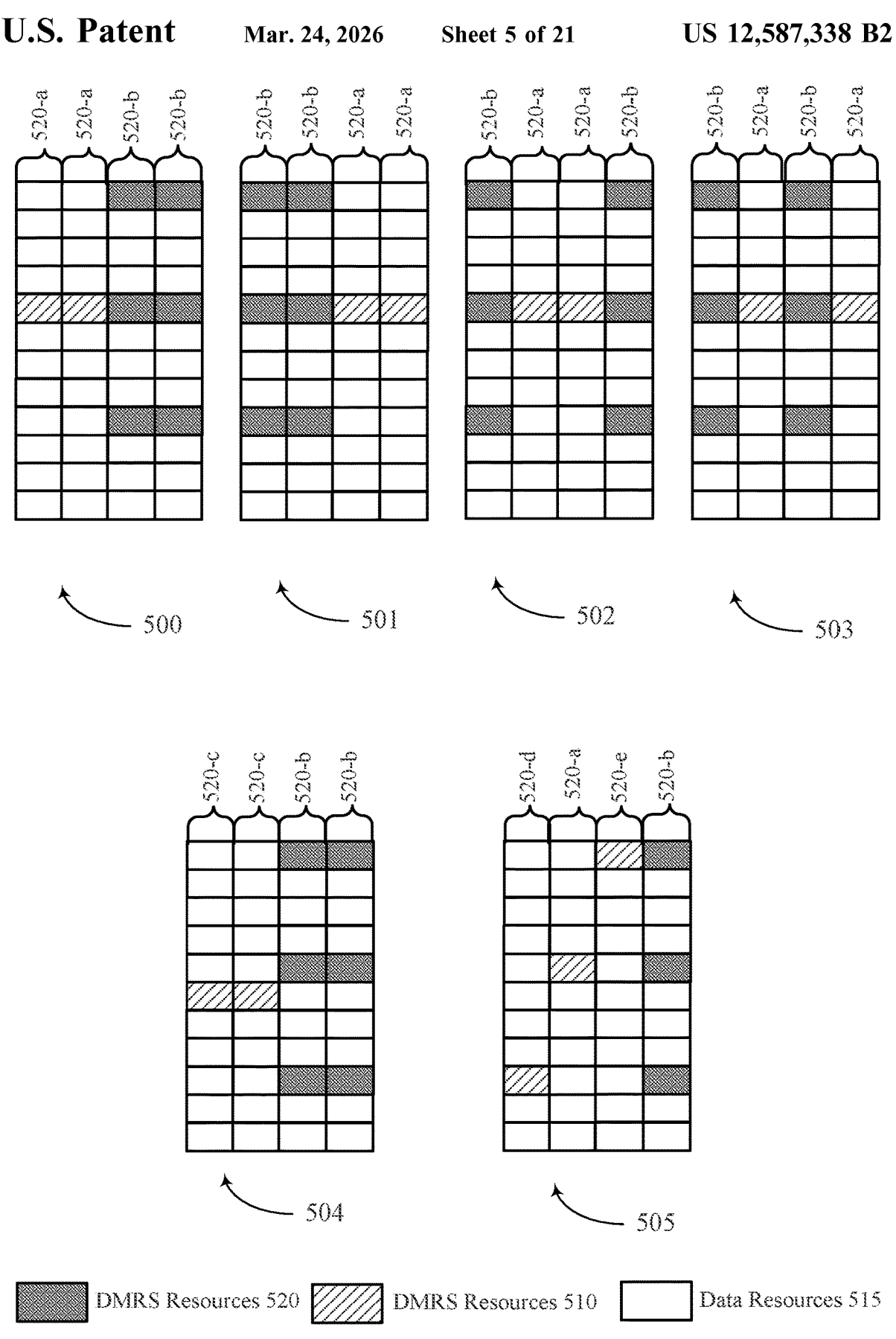

FIG. 5 illustrate examples of DMRS schemes 500, 501, 502, 503, 504, and 505 that support demodulation reference signal enhancements for control channel repetitions in accordance with aspects of the present disclosure. In some examples, the various DMRS schemes may be implemented by, or related to, aspects of wireless communications systems 100 or 200. For example, a base station 105 or a UE 115 may implement the DMRS schemes for control channel repetitions 520 (e.g., PDCCH repetitions). Generally, the DMRS schemes may illustrate examples of using lower DMRS density repetitions 520 in a set of repetitions 520 (e.g., four repetitions 520, among other quantities of repetitions 520 in a set of repetitions 420).

A wireless device (e.g., a base station 105 and/or a UE 115) may identify a configuration to use to receive or transmit a DMRS scheme 500, 501, 502, 503, 504, 505, or a combination thereof (e.g., a set of repetitions 520 in accordance with one or more of the DMRS schemes). Such a set of repetitions 520 may include aspects of instances of control information and instances of DMRSs in a CORESET. In some examples, the wireless device may identify one or more parameter values of the configuration (e.g., the wireless device may be configured with the parameter values via RRC signaling, among other examples of signaling). The wireless device may receive DMRSs via the DMRS schemes 505 (e.g., a first set of DMRSs), the DMRS schemes 510 (e.g., a second set of DMRSs), or both, based on the parameter values. The wireless device may receive repetitions of control information via the data resources 515 illustrated in the DMRS schemes.

The wireless device may identify one or more DMRS densities based at least in part on the one or more parameter values. For example, the one or more parameter values may indicate a DMRS density for one or more repetitions 520 in a set of repetitions 520. The DMRS density may be a quantity of DMRS resources 510 (e.g., resource elements allocated for receiving or transmitting DMRSs) per repetition 520 of a set of repetitions 520. As an illustrative example, the one or more parameters may indicate a DMRS density of 8.3% for the repetition 520-*a* (e.g., one resource element in every twelve resource elements of the repetition 520-*a* may be allocated for a subset of a first set of DMRSs) and a DMRS density of 25% for the repetition 520-*b* (e.g., one resource element in every four resource elements of the repetition 520-*b* may be allocated for a subset of a second set of DMRSs). In some examples, any DMRS density may be implemented for one or more of the repetitions 520 (e.g., 0% density to 100% density).

The one or more parameter values may enable the wireless device to implement relatively lower DMRS density in some or all of the repetitions 520 (e.g., a lower DMRS density compared to the DMRS scheme 300). Such lower DMRS density may result in relatively efficient communications (e.g., more control information may be transmitted via the data resources 515 in a TTI). For illustrative clarity, the repetitions 520 that include a relatively lower DMRS density include DMRS resources 510 for a second set of DMRSs, and the repetitions 520 that include a relatively higher DMRS density include DMRS resources 520 for a first set of DMRSs, in accordance with the one or more parameter values.

Although illustrated as each repetition 520 being associated with a one OFDM symbol CORESET and a set of repetitions 520 including four repetitions 520, it is to be understood that any CORESET and/or size of a set of repetitions 520 may be used. For example, the CORESET associated with a repetition 520 may include a set of OFDM symbols (e.g., a two symbol CORESET). In some examples, each OFDM symbol of the CORESET may be configured with a same DMRS density (e.g., a same lower DMRS density including DMRS resources 510). In some other examples, a portion of the OFDM symbols may be configured with a first DMRS density and a portion of the OFDM symbols may be configured with a second DMRS density (e.g., one symbol of a two symbol CORESET may correspond to a lower DMRS density than a second symbol of the two symbol CORESET).

The DMRS schemes may illustrate multiple examples of implementing lower DMRS density in a portion of a set of repetitions. For example, the DMRS schemes may include examples of lower DMRS density repetitions 520 located in the front (e.g., DMRS scheme 500), end (e.g., DMRS scheme 501), middle (e.g., DMRS scheme 502), or distributed throughout each set of repetitions 520 (e.g., DMRS scheme 503). In other words, the location of DMRS resources 510 (e.g., associated with the second set of DMRSs with a relatively low DMRS density) may be located within a set of repetitions 520 in accordance with one or more parameter values (e.g., in the first two repetitions 520, in the last two repetitions 520, in the middle two repetitions, or distributed throughout the set of repetitions 520, among other examples of densities, quantities of DMRS resources 510, etc.). In some examples, all of the repetitions 520 in a control channel may be configured to have the same DMRS density (e.g., the same higher DMRS density or the same lower DMRS density).

The wireless device may implement one or more rules (e.g., indicated by the one or more parameter values, preconfigured at the wireless device, or a combination thereof). The wireless device may identify a DMRS density in accordance with the one or more rules. As an illustrative example, a DMRS density X may be used for a set of N repetitions 520, where X is dependent on the value of N (e.g., X=25% for N=1 or 2, X=8.3% for N>2, among other examples). Additionally or alternatively, the wireless device may implement different DMRS densities in N repetitions 520 (e.g., a first half of the N repetitions 520, N/2, may have a first DMRS density and a second half of the N repetitions 520, N/2, may have a second DMRS density).

In some examples, the additional DMRS resources 510 may be configured in a DMRS pattern, as illustrated with reference to the DMRS schemes (e.g., DMRS scheme 504 and DMRS scheme 505). For example, DMRS resource element locations in a lower DMRS density repetition 520 (e.g., the DMRS resources 510) may be different than a legacy DMRS resource element location, different DMRS resource element locations in different repetitions 520 may include lower DMRS densities, etc. In some examples, the DMRS density pattern across slots may be reset at the beginning of each slot (e.g., slot-common DMRS density pattern indicated by the one or more parameter values of the configuration). In some examples, the lower DMRS density repetitions 520 may be based on rate matching techniques. For example, a wireless device may rate match during channel encoding to allocate the available quantity of resource elements for a control channel payload, as described with reference to FIG. 4.

FIG. 6 illustrates an example of a DMRS schemes 600 and 601 that supports demodulation reference signal enhancements for control channel repetitions in accordance with aspects of the present disclosure. In some examples, the DMRS schemes 600 and 601 may be implemented by, or related to, aspects of wireless communications systems 100 or 200. For example, a base station 105 or a UE 115 may implement the DMRS scheme 600 or the DMRS scheme 601 for control channel repetitions (e.g., PDCCH repetitions). Generally, the DMRS schemes may illustrate examples of using power boosted DMRS resources 510 in control channel repetitions.

A wireless device (e.g., a base station 105 and/or a UE 115) may identify a configuration to use to receive or transmit a DMRS scheme 600 and/or 601 (e.g., a set of repetitions 620 in accordance with one or more of the DMRS schemes). Such a set of repetitions 620 may include aspects of instances of control information and instances of DMRSs in a CORESET. In some examples, the wireless device may identify one or more parameter values of the configuration (e.g., the wireless device may be configured with the parameter values via RRC signaling, among other examples of signaling). The wireless device may receive or transmit DMRSs via the DMRS resources 605 (e.g., a first set of DMRSs), the power boosted DMRS resources 610 (e.g., a second set of DMRSs), or both, based on the parameter values. The wireless device may receive repetitions of control information via the data resources 615 illustrated in the DMRS schemes.

The wireless device may identify one or more power parameters of the configuration. For example, the wireless device may identify power parameters associated with a first set of DMRSs (e.g., DMRS transmissions using the DMRS resources 605) and/or power parameters associated with a second set of DMRSs (e.g., DMRS transmissions using the DMRS resources 610). The wireless device may receive or transmit the DMRSs in accordance with the power parameters. For example, a UE may be configured with an energy power allocated to a resource element (EPRE) ratio parameter. The EPRE ratio parameter may indicate a power ratio between a DMRS resource 605 or a DMRS resource 610 (e.g., a PDCCH DMRS resource element) and a data resource 615 (e.g., a PDCCH payload resource element). As an illustrative example, a power boosted DMRS (e.g., transmitted via the DMRS resources 610) may be a ratio value greater than 3 dB (e.g., if DMRS REs are power boosted by 3 dB), although any ratio value for any repetition may be used (e.g., the ratio may be greater than 3 dB). In some examples, a configured value of the EPRE ratio indicated by the one or more power parameters may be based on a quantity of repetitions (e.g., the quantity of repetitions in the set of repetitions, a quantity of repetitions that include power boosted DMRS resources 615, etc.).

In some examples, each repetition may use a same EPRE ratio (e.g., each DMRS in the set of repetitions may be power boosted as illustrated by the DMRS resources 610 in the DMRS scheme 600). In some other examples, different repetitions may use different EPRE ratios (e.g., as illustrated with reference to the DMRS scheme 601). For example, a first repetition may use a first EPRE ratio (e.g., the PDCCH DMRS resource elements may be power boosted due to a relatively higher EPRE ratio) and a second repetition may use a second EPRE ratio (e.g., the PDCCH DMRS resource elements may use a lower power due to a relatively lower EPRE ratio). The DMRS resources 610 associated with a relatively higher energy power ratio may be configured to be located at the beginning repetitions of a set of repetitions, at the end repetitions of the set of repetitions, at the middle repetitions of the set of repetitions, distributed throughout the set of repetitions, or any combination thereof.

In some examples, the wireless device may maintain a same transmission power for a repetition including boosted DMRS resources 610 as well as a repetition including non-boosted DMRS resources 605. For example, some resource elements for the PDCCH payload (e.g., data resources 615) may be muted if the power parameters for a repetition indicate boosted DMRS resources 610. Additionally or alternatively, a power allocated for transmitting the PDCCH payload over the data resources 615 may be decreased, which in some cases may enable the wireless device to refrain from muting resource elements.

Figure 7:
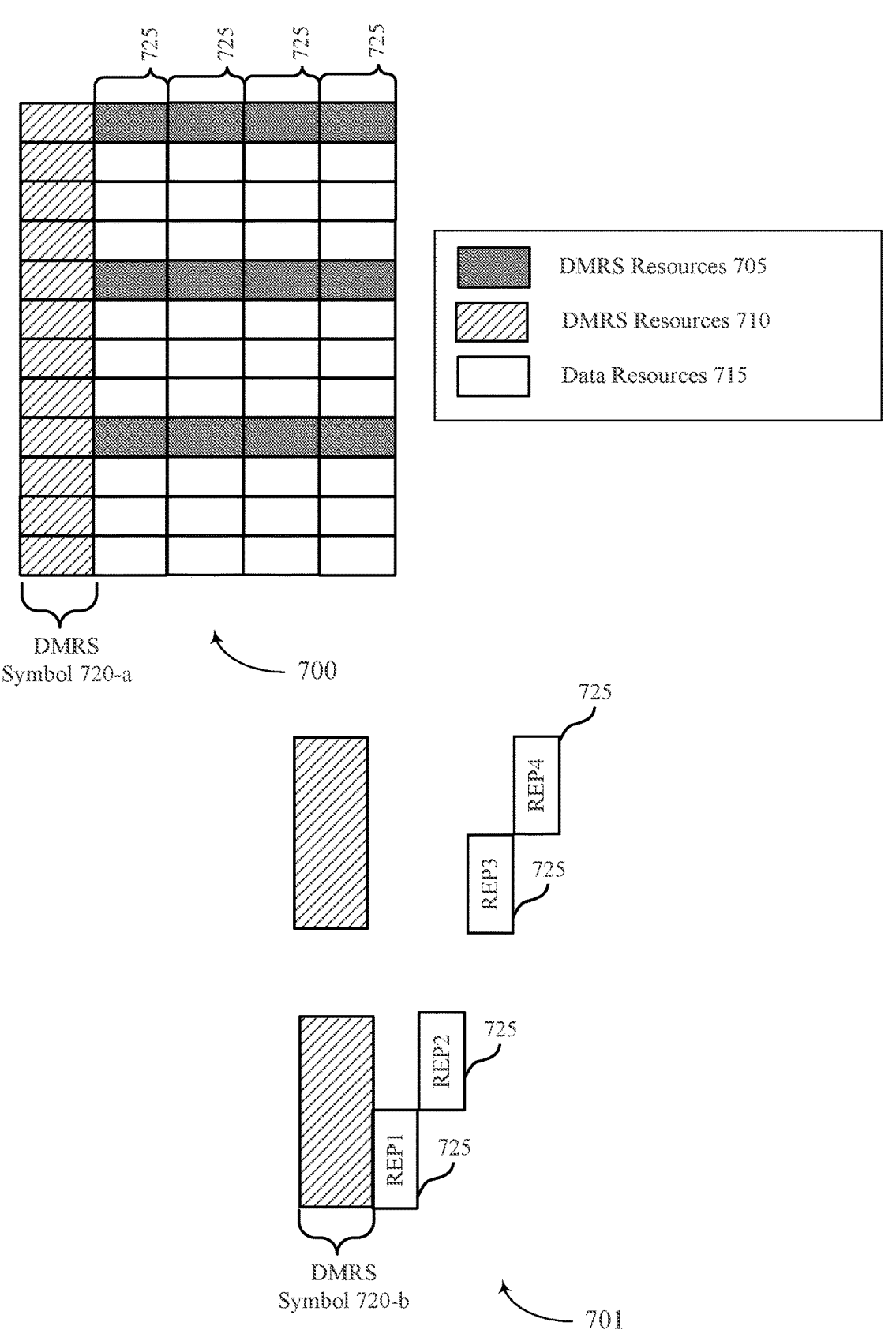

FIG. 7 illustrates examples of a DMRS scheme 700 and a DMRS scheme 701 that support demodulation reference signal enhancements for control channel repetitions in accordance with aspects of the present disclosure. In some examples, the DMRS schemes 700 and 701 may be implemented by, or related to, aspects of wireless communications systems 100 or 200. For example, a base station 105 or a UE 115 may implement the DMRS scheme 700 and/or 701 for control channel repetitions (e.g., PDCCH repetitions transmitted via a CORESET). Generally, the DMRS scheme 700 and the DMRS scheme 701 may illustrate examples of implementing one or more dedicated DMRS symbols 720 for receiving or transmitting repetitions of control information and/or DMRSs.

A wireless device (e.g., a base station 105 and/or a UE 115) may identify a configuration to use to receive or transmit a DMRS scheme 700 or 701, or a combination thereof (e.g., a set of repetitions 725 in accordance with one or more of the DMRS schemes). Such a set of repetitions 725 may include aspects of instances of control information and instances of DMRSs in a CORESET. In some examples, the wireless device may identify one or more parameter values of the configuration (e.g., the wireless device may be configured with the parameter values via RRC signaling, among other examples of signaling). The wireless device may receive DMRSs via the DMRS resources 705 (e.g., a first set of DMRSs), the DMRS resources 710 (e.g., a second set of DMRSs), or both, based on the parameter values. The wireless device may receive repetitions of control information via the data resources 715.

In some examples, the configuration (e.g., the one or more parameter values) may indicate a DMRS symbol 720. For example, the DMRS scheme 700 may illustrate DMRS resources 705 for communicating a first set of DMRSs (e.g., in accordance with a first set of parameter values) and a dedicated DMRS symbol 720-a including DMRS resources 710 for communicating a second set of DMRSs (e.g., in accordance with a second set of parameter values). A wireless device (e.g., a UE) may be configured with a dedicated DMRS symbol 720 that occurs prior to receiving a set of PDCCH repetitions 725 (e.g., the DMRS symbol 720-a may occur in a symbol period prior to and contiguous with four repetitions 725, as illustrated in the DMRS scheme 700). In some examples, a DMRS symbol 720 may include a same frequency allocation as the monitored PDCCH repetitions 725 (e.g., a frequency domain resource allocation (FDRA) may indicate a same frequency resources for the DMRS symbol 720). As an illustrative example, an initial PDCCH transmission may be allocated to a first frequency range and the PDCCH repetitions may be allocated to a second frequency range, and the DMRS symbol 720 may be determined to span the first frequency range and the second frequency range based on an FDRA indication. Additionally or alternatively, the DMRS scheme 701 may illustrate an example of repetitions allocated to different frequency ranges and multiple DMRS resources 710 for a DMRS symbol 720-b allocated in frequency ranges covering the different repetitions.

The DMRS symbols 720 may include DMRS resources 710 for receiving one or more DMRSs (e.g., each resource element in the DMRS symbol 720-a may be a DMRS resource element). Additionally or alternatively, the DMRS symbols 720 may include other resource elements (e.g., data resources 715). In such examples, one or more power parameters (e.g., indicating boosted DMRS resources) may be configured for the DMRS resources 710 of the DMRS symbol 720 and/or the data resources 715 of the DMRS symbol 720.

In some examples, a dedicated DMRS symbol 720 may be configured to use one or more precoder granularities (e.g., indicated by the one or more parameter values of the identified configuration). For example, a dedicated DMRS symbol 720 may be configured to use a precoder granularity indicating a size of frequency resources (e.g., a quantity of resource blocks or a quantity of resource elements) for decoding one or more repetitions. In some examples, the dedicated DMRS symbol 720 may be configured with a same or different precoder granularity as the precoder granularity of an initial PDCCH transmission, or of a subset of the PDCCH repetitions. Such precoder granularities may indicate a set of contiguous resource blocks (e.g., a parameter value may indicate PRG=allContiguousRB) and/or a resource element group bundle (e.g., (e.g., a parameter value may indicate PRG=REG-bundle).

Figure 8:
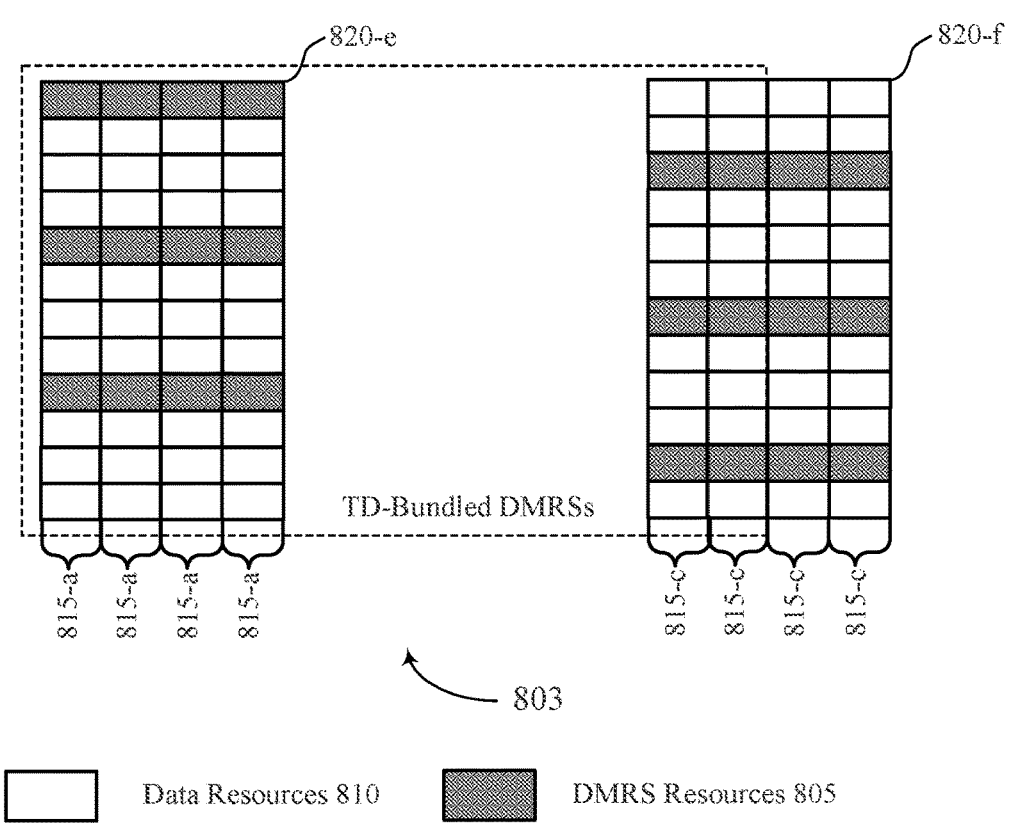

FIG. 8 illustrates examples of DMRS schemes 800, 801, 802, and 803 that support demodulation reference signal enhancements for control channel repetitions in accordance with aspects of the present disclosure. In some examples, the DMRS schemes may be implemented by, or related to, aspects of wireless communications systems 100 or 200. For example, a base station 105 or a UE 115 may implement one or more of the DMRS schemes for control channel repetitions 815 (e.g., PDCCH repetitions). Generally, the DMRS schemes may illustrate examples of implementing DMRS patterns for one or more sets of repetitions 820 and/or bundling DMRSs across multiple repetition sets 820 (e.g., including one or more repetitions 815).

A wireless device (e.g., a base station 105 and/or a UE 115) may identify a configuration to use to receive or transmit a DMRS scheme 800, 801, 802, 803, or a combination thereof (e.g., one or more repetition sets 820 in accordance with one or more of the DMRS schemes). Such a repetition set 820 may include aspects of instances of control information and instances of DMRSs in a CORE-SET. In some examples, the wireless device may identify one or more parameter values of the configuration (e.g., the wireless device may be configured with the parameter values via RRC signaling, among other examples of signaling). The wireless device may receive DMRSs via the DMRS resources 805 based on the parameter values. The wireless device may receive repetitions of control information via the data resources 810. As shown in the DMRS scheme 800 for illustrative clarity, the repetition sets 820-*a* and 820-*b* may include four repetitions 815 using a one symbol CORESET and the repetition sets 820-*c* and 820-*d* may include repetitions 815-*c* and 815-*d*, respectively, using a two symbol CORESET, although any quantity of repetitions, DMRS pattern, CORESET, etc., may be used.

The one or more parameter values may indicate a DMRS pattern for a repetition set 820 and/or a repetition 815 within a repetition set 820. For example, the wireless device may identify one or more DMRS patterns based on the one or more parameter values. The DMRS pattern may indicate locations of the DMRS resources 805 in each repetition 815 and/or each repetition set 820. As an example, the repetition set 820-*a* may illustrate a staggered DMRS pattern, which may increase a quantity of samples of the frequency domain to enhance channel estimation (e.g., different resource element locations for DMRS resources 805 in different repetitions 815 may enable more tones for the channel estimation and/or decoding of the data resources 810). In some examples, the CORESET may include more than one OFDM symbol (e.g., the repetitions 815-*c* and 815-*d* may illustrate a two symbol CORESET for an instance of control information). In such examples, different symbols (e.g., symbol periods) may be configured with different resource element locations for DMRS resources 805 within the repetition 815.

In some examples, a wireless device can be configured with multiple 820 repetition sets 820 of PDCCH repetitions. For example, a UE may be configured with two repetition sets 820-*e* and 820-*f* as illustrated by the DMRS scheme 803. In such examples, a first set of the multiple repetition sets 820 may correspond to a first pattern and a second set of the multiple sets may correspond to a second pattern (e.g., the resource element locations for DMRS resources 805 in the four repetitions 815-*a* of the first repetition set 820-*e* may be different than the resource element locations for DMRS resources 805 in the repetitions 815-*c* in the second repetition set 820-*f*). In some examples, the DMRSs may be TD-bundled across different sets of repetitions 820. The DMRS scheme 803 may illustrate a first repetition set 820-*e* that are TD bundled with a portion of the second repetition set 820-*f*. In some examples, another portion of the second repetition set 820-*f* may be TD bundled with a further repetition set 820 (e.g., the last two repetitions 815-*c* of the repetitions set 820-*f* may be TD bundled with a third repetition set 820). TD bundled DMRSs may be multiple, redundant versions of a same set of DMRSs transmitted by a base station to a UE in one or more transmission time intervals (TTIs). Such TD bundling, in addition or alternative to the various DMRS patterns, may reduce transmission delays and reduce overhead, as well as improve channel estimation.

Figure 9:
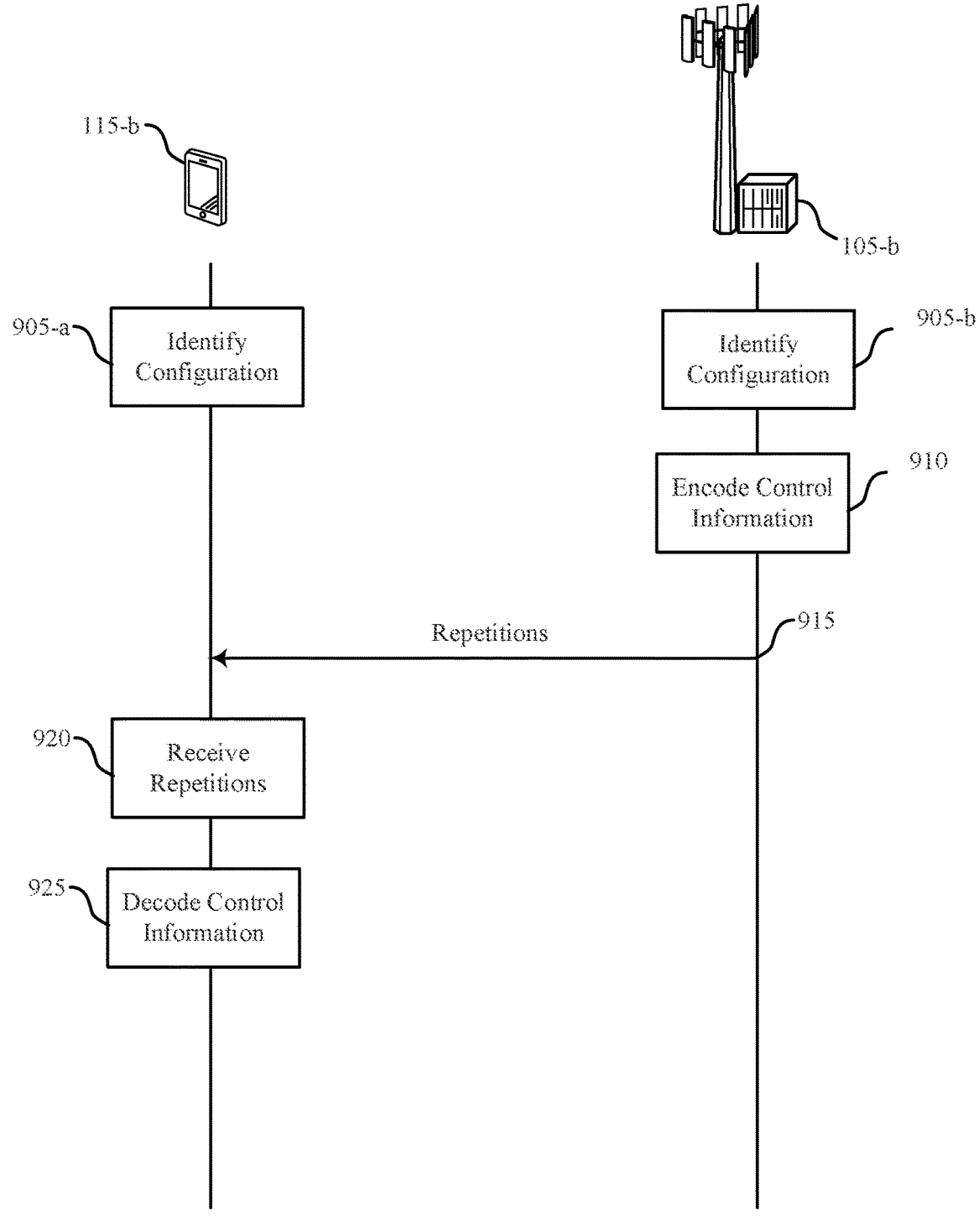
FIG. 9 illustrates an example of a process flow that supports DMRS enhancements for control channel repetitions in accordance with aspects of the present disclosure.

FIG. 9 illustrates an example of a process flow 900 that supports demodulation reference signal enhancements for control channel repetitions in accordance with aspects of the present disclosure. In some examples, the process flow 900 may be implemented by, or relate to, aspects of wireless communications systems 100 or 200. The process flow 900 may also implement aspects of one or more of the DMRS schemes as described with reference to FIGS. 3-8. The process flow 900 may be implemented by one or more of a base station 105-*b* or a UE 115-*b*, which may be examples of a base station 105 and a UE 115 as described herein. Generally, the process flow 900 illustrates example operations for implementing one or more DMRS schemes for control channel repetitions.

In the following description of the process flow 900, the operations between the UE 115-*b* and the base station 105-*b* may be transmitted in a different order than the order shown, or the operations performed by the base station 105-*b* or the UE 115-*b* may be performed in different orders or at different times. Specific operations may also be left out of the process flow 900, or other operations may be added to the process flow 900. Although the base station 105-*b* and the UE 115-*b* are shown performing the operations of process flow 900, some aspects of some operations may also be performed by another wireless device.

At 905-*a*, the UE 115-*b* may identify a configuration to use to receive a set of repetitions of control information on a downlink control channel (e.g., PDCCH repetitions), each repetitions of the set of repetitions including one or more symbol periods for an instance of the repeated control information. The configuration may be an example of the various configurations described herein with reference to FIGS. 1-8. For example, the configuration may include one or more parameter values indicating one or more of the DMRS schemes described herein. In some examples, the UE may receive signaling (e.g., RRC signaling) indicating the one or more parameter values. Additionally or alternatively, the UE may be pre-configured with the one or more parameter values.

At 905-*b*, the base station 105-*b* may identify a configuration to use to transmit a set of repetitions of control information on a downlink control channel (e.g., PDCCH repetitions), each repetitions of the set of repetitions including one or more symbol periods for an instance of the repeated control information. The configuration may be an example of the various configurations described herein with reference to FIGS. 1-8. For example, the configuration may include one or more parameter values indicating one or more of the DMRS schemes described herein.

At 910, the base station 105-*b* may encode the control information. For example, the base station 105-*b* may encode the control information in accordance with one or more parameter values (e.g., using a first precoder granularity for a first subset of a set of repetitions and using a second precoder granularity for a second subset of the set of repetitions), for example, of a polar coding scheme, among other examples of encoding.

At 915, the base station 105-*b* may transmit the set of repetitions of control information to the UE 115-*b*. For example, the base station 105-*b* may transmit a first set of DMRSs in accordance with a first set of parameter values of the configuration, a second set of DMRSs in accordance with a second set of parameter values of the configuration, and instances of the control information across one or more data repetitions as described herein (e.g., in accordance with one or more DMRS schemes indicated by the parameter values).

At 920, the UE 115-*b* may receive the set of repetitions of control information as described herein. For example, the UE 115-*b* may receive a first set of DMRSs in accordance with a first set of parameter values of the configuration, a second set of DMRSs in accordance with a second set of parameter values of the configuration, and instances of the control information across one or more data repetitions as described herein (e.g., in accordance with one or more DMRS schemes indicated by the parameter values).

At 925, the UE 115-*b* may decode the control information based at least in part on receiving the set of repetitions. For example, the UE 115-*b* may perform a channel estimation procedure using the first set of DMRSs and the second set of DMRSs as described herein, which may result in enhanced communication efficiency and/or reliability. Additionally or alternatively, the UE 115-*b* may decode the control information in accordance with a first precoder granularity and/or a second precoder granularity, as described herein including with reference to FIG. 2.

FIG. 10 shows a block diagram 1000 of a device 1005 that supports demodulation reference signal enhancements for control channel repetitions in accordance with aspects of the present disclosure. The device 1005 may be an example of aspects of a UE 115 as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to demodulation reference signal enhancements for control channel repetitions, etc.). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may identify a configuration to use to receive a set of repetitions of control information on a downlink control channel, each repetition of the set of repetitions including one or more symbol periods for an instance of the repeated control information, receive, in a first subset of repetitions of the set of repetitions according to a first set of parameter values of the configuration, a first set of demodulation reference signals for the repeated control information, receive, according to a second set of parameter values of the configuration, a second set of demodulation reference signals for the control information, receive, in each repetition of the set of repetitions, the instance of the repeated control information, and decode the control information based on the received first set of demodulation reference signals and the received second set of demodulation reference signals. The communications manager 1015 may also identify a configuration to use to receive a set of repetitions of control information on a downlink control channel, each repetition of the set of repetitions including one or more symbol periods for an instance of the repeated control information, a first subset of repetitions of the set of repetitions associated with a first type of precoder granularity, and a second subset of repetitions of the set of repetitions associated with a second type of precoder granularity, receive, in each repetition of the set of repetitions, the instance of the repeated control information on the downlink control channel, and decode the control information in the first subset of repetitions according to the first type of precoder granularity and the control information in the second subset of repetitions according to the second type of precoder granularity. The communications manager 1015 may be an example of aspects of the communications manager 1310 described herein.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The actions performed by the communications manager 1015 as described herein may be implemented to realize one or more potential advantages. One implementation may enable a UE 115 to implement various DMRS schemes for a set of control channel repetitions, which may improve channel estimation and/or communications efficiency, among other advantages.

Based on implementing the techniques described herein, a processor of the UE 115 (e.g., a processor controlling the receiver 1010, the communications manager 1015, the transmitter 1020, or a combination thereof) may implement different precoding granularities for different transmissions and/or re-transmissions, which may save power at the UE 115 and reduce decoding complexity, among other advantages.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
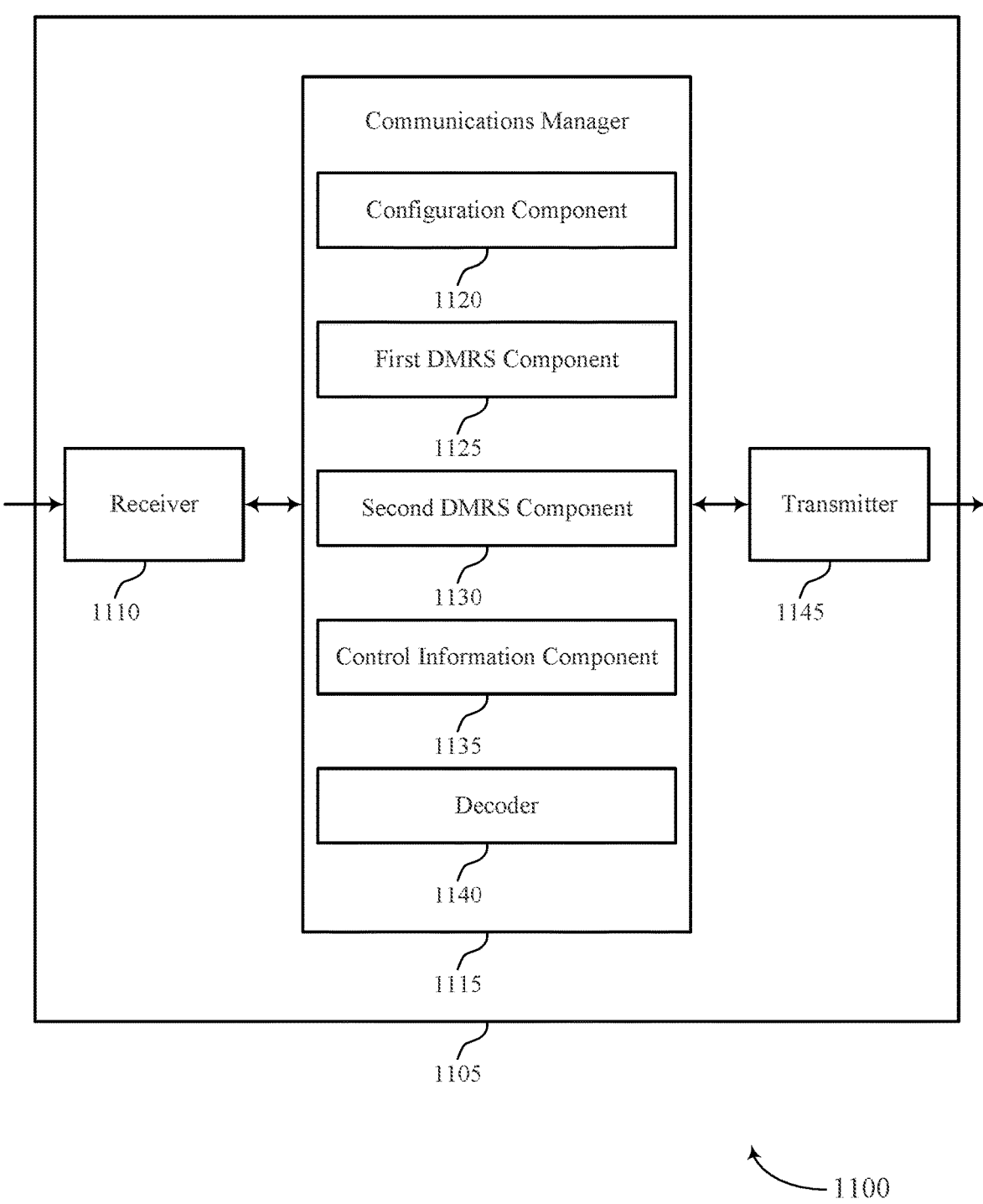

FIG. 11 shows a block diagram 1100 of a device 1105 that supports demodulation reference signal enhancements for control channel repetitions in accordance with aspects of the present disclosure. The device 1105 may be an example of aspects of a device 1005, or a UE 115 as described herein.

The device 1105 may include a receiver 1110, a communications manager 1115, and a transmitter 1145. The device 1105 may also include a processor. Each of these components may be in communication with one another (e.g., via one or more buses).

The receiver 1110 may receive information such as packets, user data, or control information associated with various information channels (e.g., control channels, data channels, and information related to demodulation reference signal enhancements for control channel repetitions, etc.). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include a configuration component 1120, a first DMRS component 1125, a second DMRS component 1130, a control information component 1135, and a decoder 1140. The communications manager 1115 may be an example of aspects of the communications manager 1310 described herein.

The configuration component 1120 may identify a configuration to use to receive a set of repetitions of control information on a downlink control channel, each repetition of the set of repetitions including one or more symbol periods for an instance of the repeated control information. The first DMRS component 1125 may receive, in a first subset of repetitions of the set of repetitions according to a first set of parameter values of the configuration, a first set of demodulation reference signals for the repeated control information. The second DMRS component 1130 may receive, according to a second set of parameter values of the configuration, a second set of demodulation reference signals for the control information. The control information component 1135 may receive, in each repetition of the set of repetitions, the instance of the repeated control information. The decoder 1140 may decode the control information based on the received first set of demodulation reference signals and the received second set of demodulation reference signals.

The configuration component 1120 may identify a configuration to use to receive a set of repetitions of control information on a downlink control channel, each repetition of the set of repetitions including one or more symbol periods for an instance of the repeated control information, a first subset of repetitions of the set of repetitions associated with a first type of precoder granularity, and a second subset of repetitions of the set of repetitions associated with a second type of precoder granularity. The control information component 1135 may receive, in each repetition of the set of repetitions, the instance of the repeated control information on the downlink control channel. The decoder 1140 may decode the control information in the first subset of repetitions according to the first type of precoder granularity and the control information in the second subset of repetitions according to the second type of precoder granularity.

The transmitter 1145 may transmit signals generated by other components of the device 1105. In some examples, the transmitter 1145 may be collocated with a receiver 1110 in a transceiver module. For example, the transmitter 1145 may be an example of aspects of the transceiver 1320 described with reference to FIG. 13. The transmitter 1145 may utilize a single antenna or a set of antennas.

Figure 12:
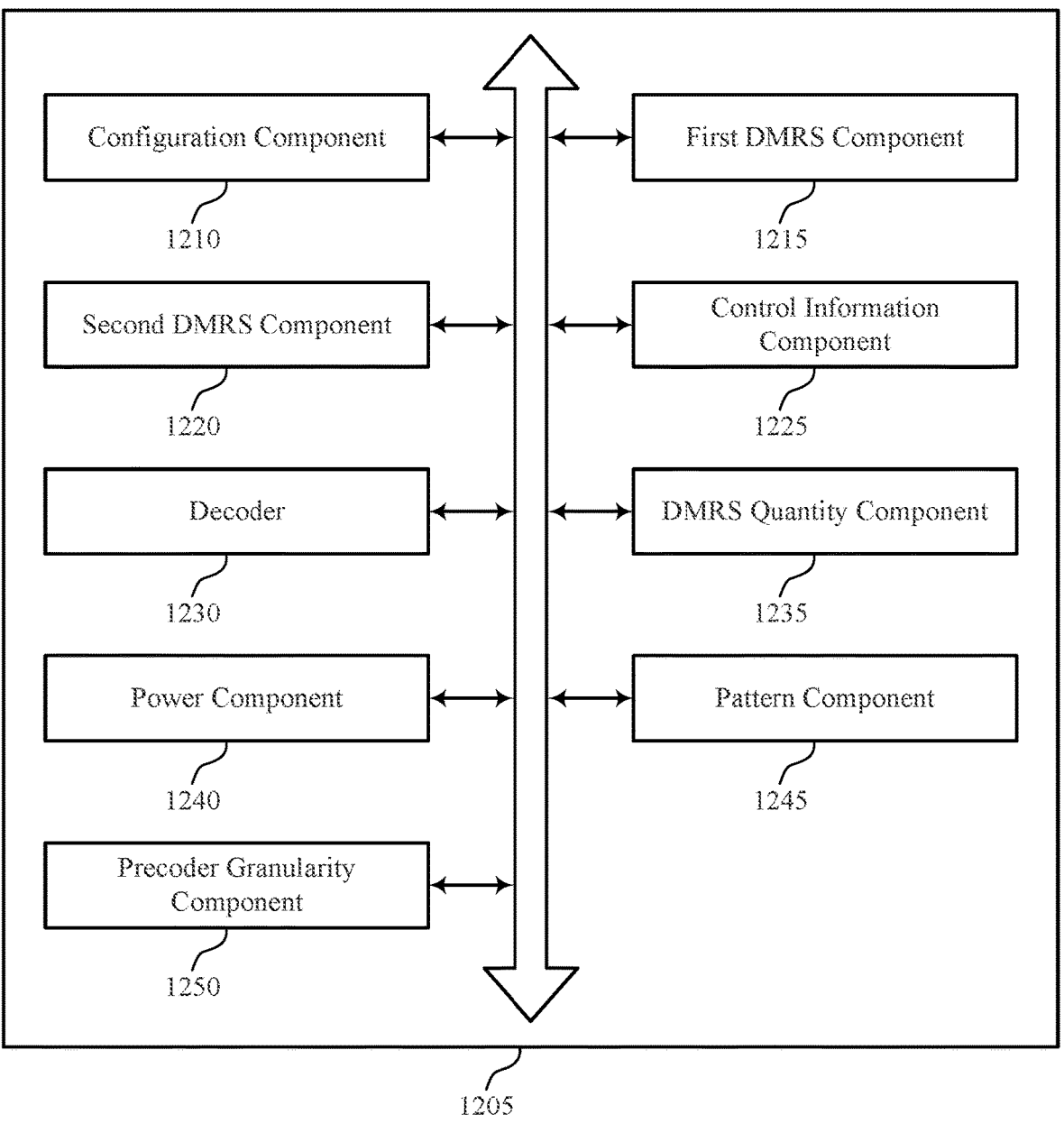
FIG. 12 shows a block diagram of a communications manager that supports DMRS enhancements for control channel repetitions in accordance with aspects of the present disclosure.

FIG. 12 shows a block diagram 1200 of a communications manager 1205 that supports demodulation reference signal enhancements for control channel repetitions in accordance with aspects of the present disclosure. The communications manager 1205 may be an example of aspects of a communications manager 1015, a communications manager 1115, or a communications manager 1310 described herein. The communications manager 1205 may include a configuration component 1210, a first DMRS component 1215, a second DMRS component 1220, a control information component 1225, a decoder 1230, a DMRS quantity component 1235, a power component 1240, a pattern component 1245, and a precoder granularity component 1250. Each of these modules may communicate, directly or indirectly, with one another (e.g., via one or more buses).

The configuration component 1210 may identify a configuration to use to receive a set of repetitions of control information on a downlink control channel, each repetition of the set of repetitions including one or more symbol periods for an instance of the repeated control information. In some examples, the configuration component 1210 may identify a configuration to use to receive a set of repetitions of control information on a downlink control channel, each repetition of the set of repetitions including one or more symbol periods for an instance of the repeated control information, a first subset of repetitions of the set of repetitions associated with a first type of precoder granularity, and a second subset of repetitions of the set of repetitions associated with a second type of precoder granularity.

In some examples, the configuration component 1210 may receive a configuration message from a base station, where identifying the configuration is based on the received configuration message. In some cases, a set of symbol periods corresponding to the set of repetitions, including the one or more symbol periods for each repetition, are contiguous in a time domain.

The first DMRS component 1215 may receive, in a first subset of repetitions of the set of repetitions according to a first set of parameter values of the configuration, a first set of demodulation reference signals for the repeated control information.

The second DMRS component 1220 may receive, according to a second set of parameter values of the configuration, a second set of demodulation reference signals for the control information. In some examples, the second DMRS component 1220 may receive, in a symbol period prior to the set of repetitions, the second set of demodulation reference signals. In some cases, the first set of parameter values indicates a first quantity of demodulation reference signals per repetition of the first subset of repetitions, the second set of parameters indicating a second quantity of demodulation reference signals per repetition of a second subset of repetitions. In some cases, the first quantity of demodulation reference signals per repetition of the first subset of repetitions is greater than or equal to the second quantity of demodulation reference signals per repetition of the second subset of repetitions. In some cases, the first quantity of demodulation reference signals per repetition of the first subset of repetitions is less than the second quantity of demodulation reference signals per repetition of the second subset of repetitions. In some cases, the second set of parameter values indicates resources for the second set of demodulation reference signals.

The control information component 1225 may receive, in each repetition of the set of repetitions, the instance of the repeated control information. In some examples, the control information component 1225 may receive, in each repetition of the set of repetitions, the instance of the repeated control information on the downlink control channel.

The decoder 1230 may decode the control information based on the received first set of demodulation reference signals and the received second set of demodulation reference signals. In some examples, the decoder 1230 may decode the control information in the first subset of repetitions according to the first type of precoder granularity and the control information in the second subset of repetitions according to the second type of precoder granularity.

The DMRS quantity component 1235 may identify the first quantity and the second quantity based on a quantity of repetitions of the set of repetitions, an index of each repetition in the set of repetitions in accordance with a demodulation reference signal pattern, or a combination thereof.

The power component 1240 may identify one or more power parameters of the first set of parameter values, the second set of parameter values, or both, the one or more power parameters indicating a first EPRE ratio associated with the first set of demodulation reference signals and resource elements associated with the first subset of repetitions. In some cases, the one or more power parameters indicate the first EPRE ratio for the first subset of repetitions and a second subset of repetitions of the set of repetitions. In some cases, the one or more power parameters indicate a second EPRE ratio between resource elements associated with the second set of demodulation reference signals and resource elements associated with a second subset of repetitions, the second EPRE ratio different than the first EPRE ratio.

The pattern component 1245 may identify a first pattern for receiving the first set of demodulation reference signals, the second set of demodulation reference signals, or both, based on the identified configuration, the first pattern indicating resource element locations for receiving one or more demodulation reference signals in each repetition of the set of repetitions. In some examples, the pattern component 1245 may identify a second pattern for receiving a third set of demodulation reference signals in a second set of repetitions of the control information based on the identified configuration, the second pattern indicating resource element locations for receiving one or more demodulation reference signals in each repetition of the second set of repetitions. In some cases, the first set of repetitions is time domain bundled with the second set of repetitions.

The precoder granularity component 1250 may determine that a first repetition of the set of repetitions is associated with the first type of precoder granularity, the first subset of repetitions including the first repetition. In some examples, the precoder granularity component 1250 may determine that a remainder of the set of repetitions is associated with the second type of precoder granularity, the second subset of repetitions including the remainder of the set of repetitions. In some cases, the first repetition includes an initial repetition of the set of repetitions. In some cases, the first subset of repetitions includes a set of repetitions associated with the first type of precoder granularity and the second subset of repetitions includes a set of repetitions associated with the second type of precoder granularity. In some cases, the first type of precoder granularity indicates a size of frequency resources associated with each of a set of contiguous resource blocks, where the second type of precoder granularity indicates a size of frequency resources associated with a resource element group bundle.

Figure 13:
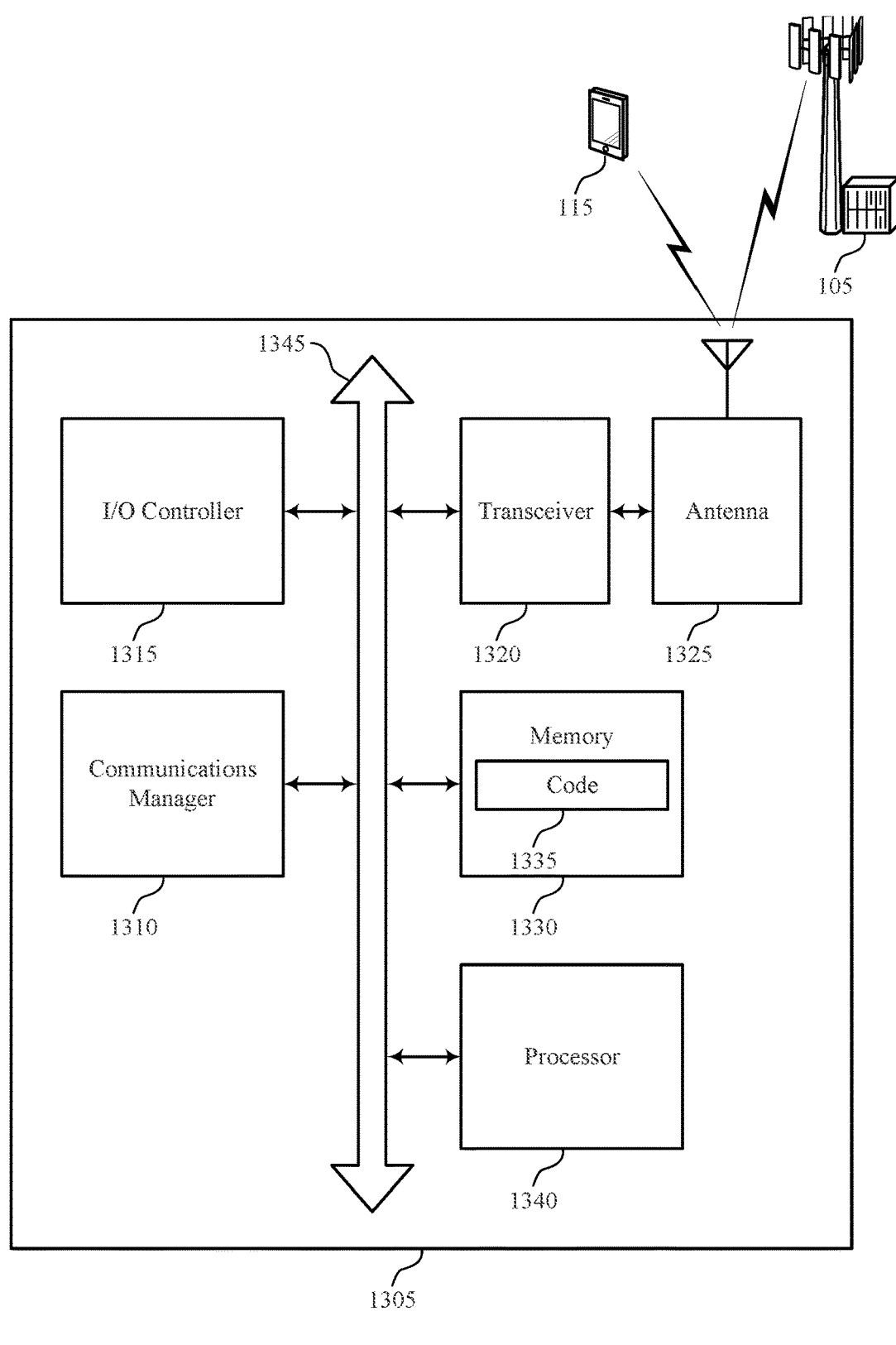
FIG. 13 shows a diagram of a system including a device that supports DMRS enhancements for control channel repetitions in accordance with aspects of the present disclosure.

FIG. 13 shows a diagram of a system 1300 including a device 1305 that supports demodulation reference signal enhancements for control channel repetitions in accordance with aspects of the present disclosure. The device 1305 may be an example of or include the components of device 1005, device 1105, or a UE 115 as described herein. The device 1305 may include components for bi-directional voice and data communications including components for transmitting and receiving communications, including a communications manager 1310, an I/O controller 1315, a transceiver 1320, an antenna 1325, memory 1330, and a processor 1340. These components may be in electronic communication via one or more buses (e.g., bus 1345).

The communications manager 1310 may identify a configuration to use to receive a set of repetitions of control information on a downlink control channel, each repetition of the set of repetitions including one or more symbol periods for an instance of the repeated control information, receive, in a first subset of repetitions of the set of repetitions according to a first set of parameter values of the configuration, a first set of demodulation reference signals for the repeated control information, receive, according to a second set of parameter values of the configuration, a second set of demodulation reference signals for the control information, receive, in each repetition of the set of repetitions, the instance of the repeated control information, and decode the control information based on the received first set of demodulation reference signals and the received second set of demodulation reference signals. The communications manager 1310 may also identify a configuration to use to receive a set of repetitions of control information on a downlink control channel, each repetition of the set of repetitions including one or more symbol periods for an instance of the repeated control information, a first subset of repetitions of the set of repetitions associated with a first type of precoder granularity, and a second subset of repetitions of the set of repetitions associated with a second type of precoder granularity, receive, in each repetition of the set of repetitions, the instance of the repeated control information on the downlink control channel, and decode the control information in the first subset of repetitions according to the first type of precoder granularity and the control information in the second subset of repetitions according to the second type of precoder granularity.

The I/O controller 1315 may manage input and output signals for the device 1305. The I/O controller 1315 may also manage peripherals not integrated into the device 1305. In some cases, the I/O controller 1315 may represent a physical connection or port to an external peripheral. In some cases, the I/O controller 1315 may utilize an operating system such as iOS®, ANDROID®, MS-DOS®, MS-WINDOWS®, OS/2®, UNIX®, LINUX®, or another known operating system. In other cases, the I/O controller 1315 may represent or interact with a modem, a keyboard, a mouse, a touchscreen, or a similar device. In some cases, the I/O controller 1315 may be implemented as part of a processor. In some cases, a user may interact with the device 1305 via the I/O controller 1315 or via hardware components controlled by the I/O controller 1315.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include random-access memory (RAM) and read-only memory (ROM). The memory 1330 may store computer-readable, computer-executable code 1335 including instructions that, when executed, cause the processor to perform various functions described herein. In some cases, the memory 1330 may contain, among other things, a basic input/output system (BIOS) which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting demodulation reference signal enhancements for control channel repetitions).

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
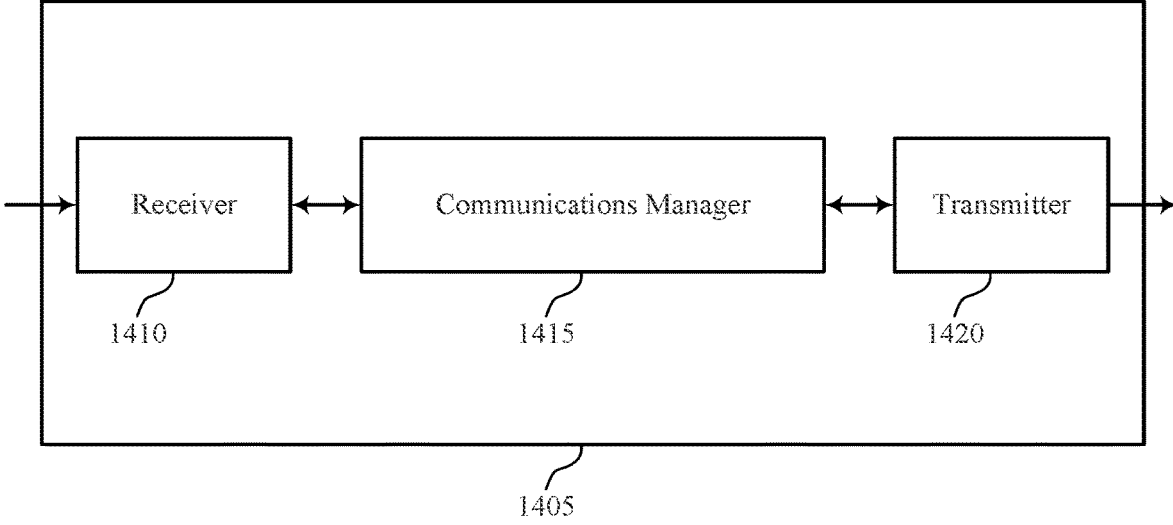
FIGS. 14 and 15 show block diagrams of devices that support DMRS enhancements for control channel repetitions in accordance with aspects of the present disclosure.

FIG. 14 shows a block diagram 1400 of a device 1405 that supports demodulation reference signal enhancements for control channel repetitions in accordance with aspects of the present disclosure. The device 1405 may be an example of aspects of a base station 105 as described herein. The device 1405 may include a receiver 1410, a communications manager 1415, and a transmitter 1420. The device 1405 may also include a processor. Each of these components may be in communication with one another (e.g., via one or more buses).

The receiver 1410 may receive information such as packets, user data, or control information associated with various information channels (e.g., control channels, data channels, and information related to demodulation reference signal enhancements for control channel repetitions, etc.). Information may be passed on to other components of the device 1405. The receiver 1410 may be an example of aspects of the transceiver 1720 described with reference to FIG. 17. The receiver 1410 may utilize a single antenna or a set of antennas.

The communications manager 1415 may identify a configuration to use to transmit a set of repetitions of control information on a downlink control channel, each repetition of the set of repetitions including one or more symbol periods for an instance of the repeated control information, transmit, in a first subset of repetitions of the set of repetitions according to a first set of parameter values of the configuration, a first set of demodulation reference signals for the repeated control information, transmit, according to a second set of parameter values of the configuration, a second set of demodulation reference signals for the control information, and transmit, in each repetition of the set of repetitions, the instance of the control information. The communications manager 1415 may also identify a configuration to use to transmit a set of repetitions of control information on a downlink control channel, each repetition of the set of repetitions including one or more symbol periods for an instance of the repeated control information, precode a first subset of repetitions of the set of repetitions according to a first type of precoder granularity, precode a second subset of repetitions of the set of repetitions according to a second type of precoder granularity, and transmit, to a UE, the set of repetitions of the control information, including the first subset of repetitions and the second subset of repetitions. The communications manager 1415 may be an example of aspects of the communications manager 1710 described herein.

The communications manager 1415, or its sub-components, may be implemented in hardware, code (e.g., software or firmware) executed by a processor, or any combination thereof. If implemented in code executed by a processor, the functions of the communications manager 1415, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1415, or its sub-components, may be physically located at various positions, including being distributed such that portions of functions are implemented at different physical locations by one or more physical components. In some examples, the communications manager 1415, or its sub-components, may be a separate and distinct component in accordance with various aspects of the present disclosure. In some examples, the communications manager 1415, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1420 may transmit signals generated by other components of the device 1405. In some examples, the transmitter 1420 may be collocated with a receiver 1410 in a transceiver module. For example, the transmitter 1420 may be an example of aspects of the transceiver 1720 described with reference to FIG. 17. The transmitter 1420 may utilize a single antenna or a set of antennas.

Figure 15:
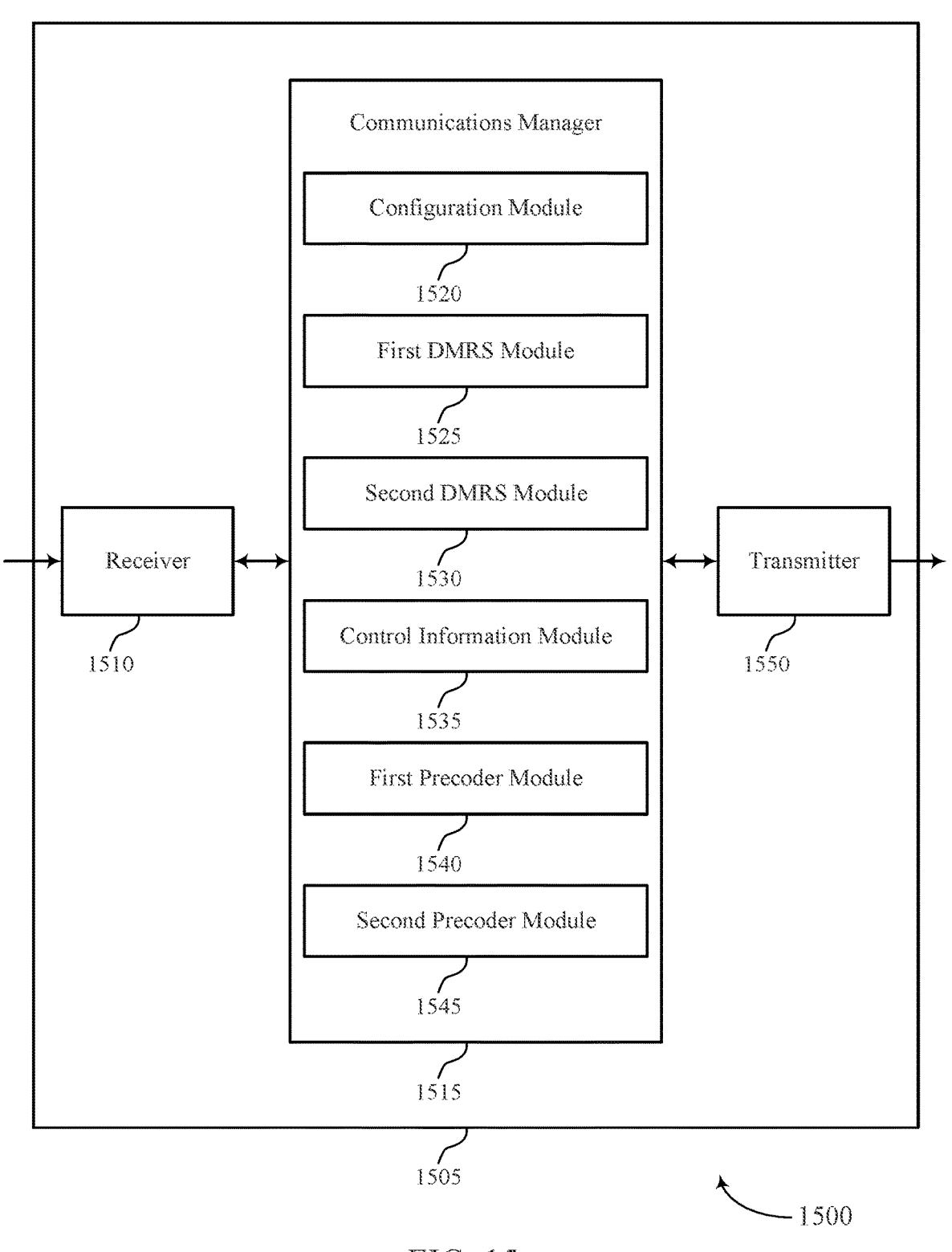

FIG. 15 shows a block diagram 1500 of a device 1505 that supports demodulation reference signal enhancements for control channel repetitions in accordance with aspects of the present disclosure. The device 1505 may be an example of aspects of a device 1405, or a base station 105 as described herein. The device 1505 may include a receiver 1510, a communications manager 1515, and a transmitter 1550. The device 1505 may also include a processor. Each of these components may be in communication with one another (e.g., via one or more buses).

The receiver 1510 may receive information such as packets, user data, or control information associated with various information channels (e.g., control channels, data channels, and information related to demodulation reference signal enhancements for control channel repetitions, etc.). Information may be passed on to other components of the device 1505. The receiver 1510 may be an example of aspects of the transceiver 1720 described with reference to FIG. 17. The receiver 1510 may utilize a single antenna or a set of antennas.

The communications manager 1515 may be an example of aspects of the communications manager 1415 as described herein. The communications manager 1515 may include a configuration module 1520, a first DMRS module 1525, a second DMRS module 1530, a control information module 1535, a first precoder module 1540, and a second precoder module 1545. The communications manager 1515 may be an example of aspects of the communications manager 1710 described herein.

The configuration module 1520 may identify a configuration to use to transmit a set of repetitions of control information on a downlink control channel, each repetition of the set of repetitions including one or more symbol periods for an instance of the repeated control information. The first DMRS module 1525 may transmit, in a first subset of repetitions of the set of repetitions according to a first set of parameter values of the configuration, a first set of demodulation reference signals for the repeated control information. The second DMRS module 1530 may transmit, according to a second set of parameter values of the configuration, a second set of demodulation reference signals for the control information. The control information module 1535 may transmit, in each repetition of the set of repetitions, the instance of the control information.

The configuration module 1520 may identify a configuration to use to transmit a set of repetitions of control information on a downlink control channel, each repetition of the set of repetitions including one or more symbol periods for an instance of the repeated control information. The first precoder module 1540 may precode a first subset of repetitions of the set of repetitions according to a first type of precoder granularity. The second precoder module 1545 may precode a second subset of repetitions of the set of repetitions according to a second type of precoder granularity. The control information module 1535 may transmit, to a UE, the set of repetitions of the control information, including the first subset of repetitions and the second subset of repetitions.

The transmitter 1550 may transmit signals generated by other components of the device 1505. In some examples, the transmitter 1550 may be collocated with a receiver 1510 in a transceiver module. For example, the transmitter 1550 may be an example of aspects of the transceiver 1720 described with reference to FIG. 17. The transmitter 1550 may utilize a single antenna or a set of antennas.

Figure 16:
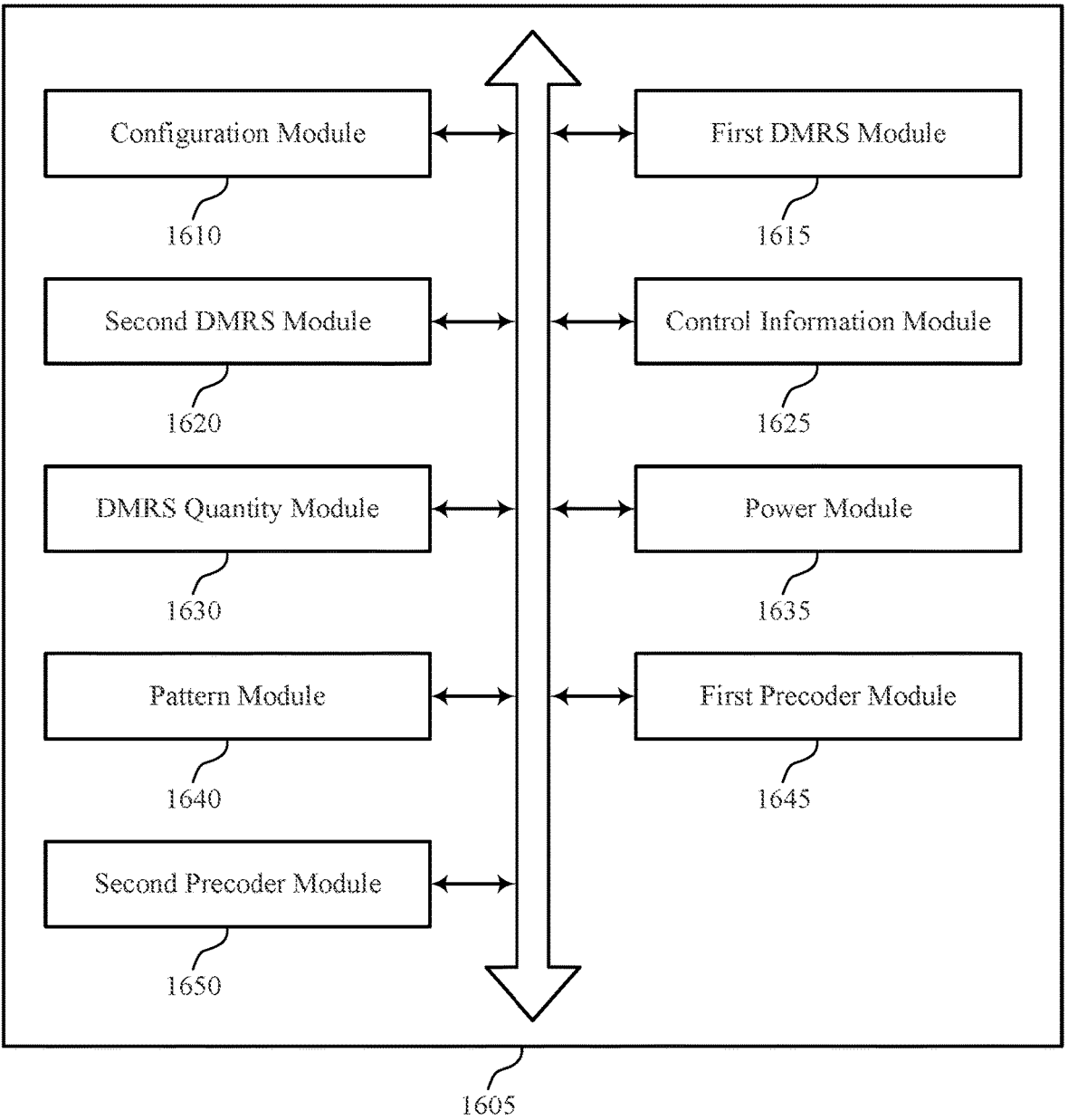
FIG. 16 shows a block diagram of a communications manager that supports DMRS enhancements for control channel repetitions in accordance with aspects of the present disclosure.

FIG. 16 shows a block diagram 1600 of a communications manager 1605 that supports demodulation reference signal enhancements for control channel repetitions in accordance with aspects of the present disclosure. The communications manager 1605 may be an example of aspects of a communications manager 1415, a communications manager 1515, or a communications manager 1710 described herein. The communications manager 1605 may include a configuration module 1610, a first DMRS module 1615, a second DMRS module 1620, a control information module 1625, a DMRS quantity module 1630, a power module 1635, a pattern module 1640, a first precoder module 1645, and a second precoder module 1650. Each of these modules may communicate, directly or indirectly, with one another (e.g., via one or more buses).

The configuration module 1610 may identify a configuration to use to transmit a set of repetitions of control information on a downlink control channel, each repetition of the set of repetitions including one or more symbol periods for an instance of the repeated control information. In some examples, the configuration module 1610 may identify a configuration to use to transmit a set of repetitions of control information on a downlink control channel, each repetition of the set of repetitions including one or more symbol periods for an instance of the repeated control information. In some examples, the configuration module 1610 may transmit a configuration message to a UE, the configuration message indicating the first set of parameter values and the second set of parameter values. In some cases, a set of symbol periods corresponding to the set of repetitions, including the one or more symbol periods for each repetition, are contiguous in a time domain.

The first DMRS module 1615 may transmit, in a first subset of repetitions of the set of repetitions according to a first set of parameter values of the configuration, a first set of demodulation reference signals for the repeated control information.

The second DMRS module 1620 may transmit, according to a second set of parameter values of the configuration, a second set of demodulation reference signals for the control information. In some examples, the second DMRS module 1620 may transmit, in a symbol period prior to the set of repetitions, the second set of demodulation reference signals. In some cases, the first set of parameter values indicates a first quantity of demodulation reference signals per repetition of the first subset of repetitions, the second set of parameters indicating a second quantity of demodulation reference signals per repetition of a second subset of repetitions of the set of repetitions. In some cases, the first quantity of demodulation reference signals per repetition of the first subset of repetitions is greater than or equal to the second quantity of demodulation reference signals per repetition of the second subset of repetitions. In some cases, the first quantity of demodulation reference signals per repetition of the first subset of repetitions is less than the second quantity of demodulation reference signals per repetition of the second subset of repetitions. In some cases, the second set of parameter values indicates the resources for the second set of demodulation reference signals.

The control information module 1625 may transmit, in each repetition of the set of repetitions, the instance of the control information. In some examples, the control information module 1625 may transmit, to a UE, the set of repetitions of the control information, including the first subset of repetitions and the second subset of repetitions.

The first precoder module 1645 may precode a first subset of repetitions of the set of repetitions according to a first type of precoder granularity. In some examples, the first precoder module 1645 may determine that a first repetition of the set of repetitions is associated with the first type of precoder granularity, the first subset of repetitions including the first repetition. In some cases, the first repetition includes an initial repetition of the set of repetitions.

The second precoder module 1650 may precode a second subset of repetitions of the set of repetitions according to a second type of precoder granularity. In some examples, the second precoder module 1650 may determine that a remainder of the set of repetitions is associated with the second type of precoder granularity, the second subset of repetitions including the remainder of the set of repetitions. In some cases, the first subset of repetitions includes a set of repetitions associated with the first type of precoder granularity and the second subset of repetitions includes a set of repetitions associated with the second type of precoder granularity. In some cases, the first type of precoder granularity indicates a size of frequency resources associated with each of a set of contiguous resource blocks, where the second type of precoder granularity indicates a size of frequency resources associated with a resource element group bundle.

The DMRS quantity module 1630 may identify the first quantity and the second quantity based on a quantity of repetitions of the set of repetitions, an index of each repetition in the set of repetitions in accordance with a demodulation reference signal pattern, or a combination thereof.

The power module 1635 may identify one or more power parameters of the first set of parameter values, the second set of parameter values, or both, the one or more power parameters indicating a first EPRE ratio between resource elements associated with the first set of demodulation reference signals and resource elements associated with the first subset of repetitions. In some examples, the power module 1635 may transmit the first set of demodulation reference signals, the second set of demodulation reference signals, and the instances of the control information in accordance with the one or more power parameters. In some cases, the one or more power parameters indicate the first EPRE ratio for the first subset of repetitions and a second subset of repetitions of the set of repetitions. In some cases, the one or more power parameters indicate a second EPRE ratio between resource elements associated with the second set of demodulation reference signals and resource elements associated with a second subset of repetitions of the set of repetitions, the second EPRE ratio different than the first EPRE ratio.

The pattern module 1640 may identify a first pattern for transmitting the first set of demodulation reference signals, the second set of demodulation reference signals, or both, based on the identified configuration, the first pattern indicating resource element locations for transmitting one or more demodulation reference signals in each repetition of the set of repetitions. In some examples, the pattern module 1640 may identify a second pattern for transmitting a third set of demodulation reference signals in a second set of repetitions of the control information based on the identified configuration, the second pattern indicating resource element locations for transmitting one or more demodulation reference signals in each repetition of the second set of repetitions. In some cases, the first set of repetitions is time domain bundled with the second set of repetitions.

Figure 17:
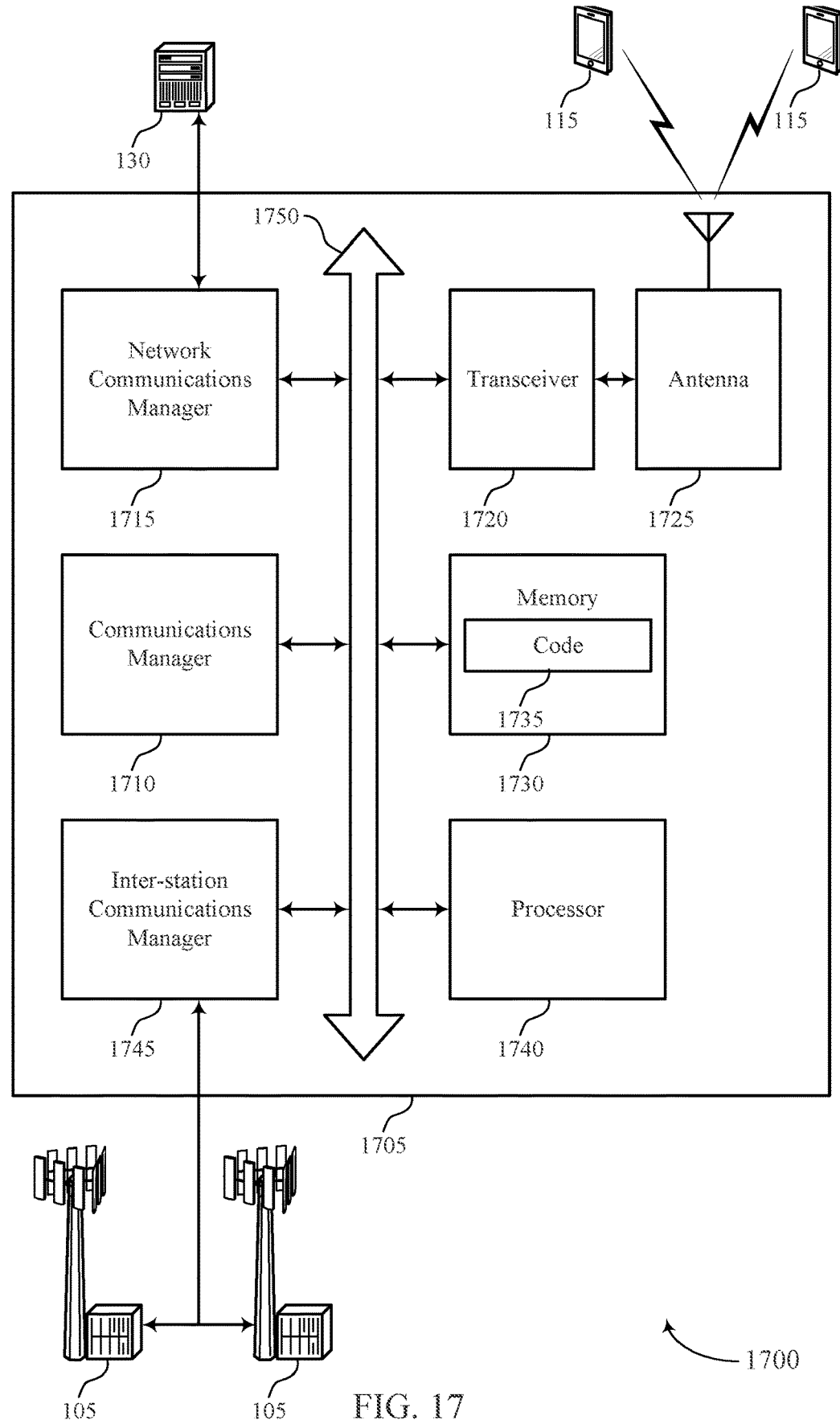
FIG. 17 shows a diagram of a system including a device that supports DMRS enhancements for control channel repetitions in accordance with aspects of the present disclosure.

FIG. 17 shows a diagram of a system 1700 including a device 1705 that supports demodulation reference signal enhancements for control channel repetitions in accordance with aspects of the present disclosure. The device 1705 may be an example of or include the components of device 1405, device 1505, or a base station 105 as described herein. The device 1705 may include components for bi-directional voice and data communications including components for transmitting and receiving communications, including a communications manager 1710, a network communications manager 1715, a transceiver 1720, an antenna 1725, memory 1730, a processor 1740, and an inter-station communications manager 1745. These components may be in electronic communication via one or more buses (e.g., bus 1750).

The communications manager 1710 may identify a configuration to use to transmit a set of repetitions of control information on a downlink control channel, each repetition of the set of repetitions including one or more symbol periods for an instance of the repeated control information, transmit, in a first subset of repetitions of the set of repetitions according to a first set of parameter values of the configuration, a first set of demodulation reference signals for the repeated control information, transmit, according to a second set of parameter values of the configuration, a second set of demodulation reference signals for the control information, and transmit, in each repetition of the set of repetitions, the instance of the control information. The communications manager 1710 may also identify a configuration to use to transmit a set of repetitions of control information on a downlink control channel, each repetition of the set of repetitions including one or more symbol periods for an instance of the repeated control information, precode a first subset of repetitions of the set of repetitions according to a first type of precoder granularity, precode a second subset of repetitions of the set of repetitions according to a second type of precoder granularity, and transmit, to a UE, the set of repetitions of the control information, including the first subset of repetitions and the second subset of repetitions.

The network communications manager 1715 may manage communications with the core network (e.g., via one or more wired backhaul links). For example, the network communications manager 1715 may manage the transfer of data communications for client devices, such as one or more UEs 115.

The transceiver 1720 may communicate bi-directionally, via one or more antennas, wired, or wireless links as described above. For example, the transceiver 1720 may represent a wireless transceiver and may communicate bi-directionally with another wireless transceiver. The transceiver 1720 may also include a modem to modulate the packets and provide the modulated packets to the antennas for transmission, and to demodulate packets received from the antennas.

In some cases, the wireless device may include a single antenna 1725. However, in some cases the device may have more than one antenna 1725, which may be capable of concurrently transmitting or receiving multiple wireless transmissions.

The memory 1730 may include RAM, ROM, or a combination thereof. The memory 1730 may store computer-readable code 1735 including instructions that, when executed by a processor (e.g., the processor 1740) cause the device to perform various functions described herein. In some cases, the memory 1730 may contain, among other things, a BIOS which may control basic hardware or software operation such as the interaction with peripheral components or devices.

The processor 1740 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1740 may be configured to operate a memory array using a memory controller. In some cases, a memory controller may be integrated into processor 1740. The processor 1740 may be configured to execute computer-readable instructions stored in a memory (e.g., the memory 1730) to cause the device 1705 to perform various functions (e.g., functions or tasks supporting demodulation reference signal enhancements for control channel repetitions).

The inter-station communications manager 1745 may manage communications with other base station 105, and may include a controller or scheduler for controlling communications with UEs 115 in cooperation with other base stations 105. For example, the inter-station communications manager 1745 may coordinate scheduling for transmissions to UEs 115 for various interference mitigation techniques such as beamforming or joint transmission. In some examples, the inter-station communications manager 1745 may provide an X2 interface within an LTE/LTE-A wireless communication network technology to provide communication between base stations 105.

The code 1735 may include instructions to implement aspects of the present disclosure, including instructions to support wireless communications. The code 1735 may be stored in a non-transitory computer-readable medium such as system memory or other type of memory. In some cases, the code 1735 may not be directly executable by the processor 1740 but may cause a computer (e.g., when compiled and executed) to perform functions described herein.

FIG. 18 shows a flowchart illustrating a method 1800 that supports demodulation reference signal enhancements for control channel repetitions in accordance with aspects of the present disclosure. The operations of method 1800 may be implemented by a UE 115 or its components as described herein. For example, the operations of method 1800 may be performed by a communications manager as described with reference to FIGS. 10 through 13. In some examples, a UE may execute a set of instructions to control the functional elements of the UE to perform the functions described below. Additionally or alternatively, a UE may perform aspects of the functions described below using special-purpose hardware.

At 1805, the UE may identify a configuration to use to receive a set of repetitions of control information on a downlink control channel, each repetition of the set of repetitions including one or more symbol periods for an instance of the repeated control information. The operations of 1805 may be performed according to the methods described herein. In some examples, aspects of the operations of 1805 may be performed by a configuration component as described with reference to FIGS. 10 through 13.

At 1810, the UE may receive, in a first subset of repetitions of the set of repetitions according to a first set of parameter values of the configuration, a first set of demodulation reference signals for the repeated control information. The operations of 1810 may be performed according to the methods described herein. In some examples, aspects of the operations of 1810 may be performed by a first DMRS component as described with reference to FIGS. 10 through 13.

At 1815, the UE may receive, according to a second set of parameter values of the configuration, a second set of demodulation reference signals for the control information. The operations of 1815 may be performed according to the methods described herein. In some examples, aspects of the operations of 1815 may be performed by a second DMRS component as described with reference to FIGS. 10 through 13.

At 1820, the UE may receive, in each repetition of the set of repetitions, the instance of the repeated control information. The operations of 1820 may be performed according to the methods described herein. In some examples, aspects of the operations of 1820 may be performed by a control information component as described with reference to FIGS. 10 through 13.

At 1825, the UE may decode the control information based on the received first set of demodulation reference signals and the received second set of demodulation reference signals. The operations of 1825 may be performed according to the methods described herein. In some examples, aspects of the operations of 1825 may be performed by a decoder as described with reference to FIGS. 10 through 13.

FIG. 19 shows a flowchart illustrating a method 1900 that supports demodulation reference signal enhancements for control channel repetitions in accordance with aspects of the present disclosure. The operations of method 1900 may be implemented by a UE 115 or its components as described herein. For example, the operations of method 1900 may be performed by a communications manager as described with reference to FIGS. 10 through 13. In some examples, a UE may execute a set of instructions to control the functional elements of the UE to perform the functions described below. Additionally or alternatively, a UE may perform aspects of the functions described below using special-purpose hardware.

At 1905, the UE may identify a configuration to use to receive a set of repetitions of control information on a downlink control channel, each repetition of the set of repetitions including one or more symbol periods for an instance of the repeated control information, a first subset of repetitions of the set of repetitions associated with a first type of precoder granularity, and a second subset of repetitions of the set of repetitions associated with a second type of precoder granularity. The operations of 1905 may be performed according to the methods described herein. In some examples, aspects of the operations of 1905 may be performed by a configuration component as described with reference to FIGS. 10 through 13.

At 1910, the UE may receive, in each repetition of the set of repetitions, the instance of the repeated control information on the downlink control channel. The operations of 1910 may be performed according to the methods described herein. In some examples, aspects of the operations of 1910 may be performed by a control information component as described with reference to FIGS. 10 through 13.

At 1915, the UE may decode the control information in the first subset of repetitions according to the first type of precoder granularity and the control information in the second subset of repetitions according to the second type of precoder granularity. The operations of 1915 may be performed according to the methods described herein. In some examples, aspects of the operations of 1915 may be performed by a decoder as described with reference to FIGS. 10 through 13.

Figure 20:
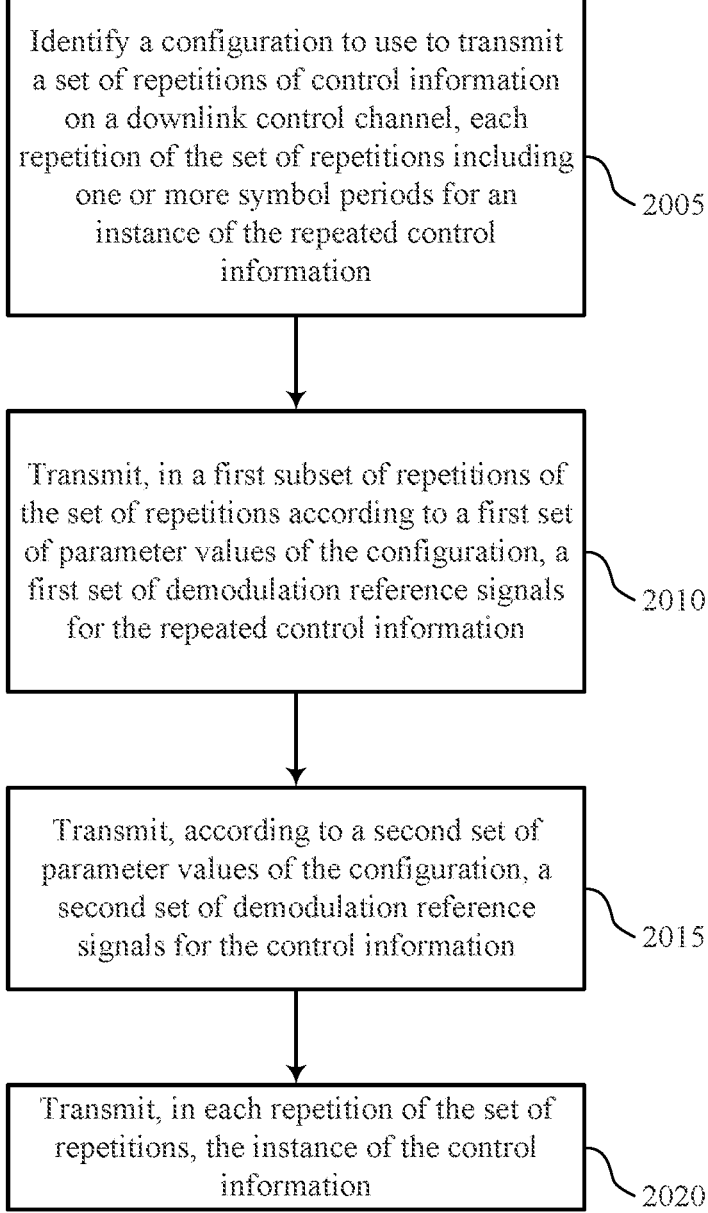

FIG. 20 shows a flowchart illustrating a method 2000 that supports demodulation reference signal enhancements for control channel repetitions in accordance with aspects of the present disclosure. The operations of method 2000 may be implemented by a base station 105 or its components as described herein. For example, the operations of method 2000 may be performed by a communications manager as described with reference to FIGS. 14 through 17. In some examples, a base station may execute a set of instructions to control the functional elements of the base station to perform the functions described below. Additionally or alternatively, a base station may perform aspects of the functions described below using special-purpose hardware.

At 2005, the base station may identify a configuration to use to transmit a set of repetitions of control information on a downlink control channel, each repetition of the set of repetitions including one or more symbol periods for an instance of the repeated control information. The operations of 2005 may be performed according to the methods described herein. In some examples, aspects of the operations of 2005 may be performed by a configuration module as described with reference to FIGS. 14 through 17.

At 2010, the base station may transmit, in a first subset of repetitions of the set of repetitions according to a first set of parameter values of the configuration, a first set of demodulation reference signals for the repeated control information. The operations of 2010 may be performed according to the methods described herein. In some examples, aspects of the operations of 2010 may be performed by a first DMRS module as described with reference to FIGS. 14 through 17.

At 2015, the base station may transmit, according to a second set of parameter values of the configuration, a second set of demodulation reference signals for the control information. The operations of 2015 may be performed according to the methods described herein. In some examples, aspects of the operations of 2015 may be performed by a second DMRS module as described with reference to FIGS. 14 through 17.

At 2020, the base station may transmit, in each repetition of the set of repetitions, the instance of the control information. The operations of 2020 may be performed according to the methods described herein. In some examples, aspects of the operations of 2020 may be performed by a control information module as described with reference to FIGS. 14 through 17.

FIG. 21 shows a flowchart illustrating a method 2100 that supports demodulation reference signal enhancements for control channel repetitions in accordance with aspects of the present disclosure. The operations of method 2100 may be implemented by a base station 105 or its components as described herein. For example, the operations of method 2100 may be performed by a communications manager as described with reference to FIGS. 14 through 17. In some examples, a base station may execute a set of instructions to control the functional elements of the base station to perform the functions described below. Additionally or alternatively, a base station may perform aspects of the functions described below using special-purpose hardware.

At 2105, the base station may identify a configuration to use to transmit a set of repetitions of control information on a downlink control channel, each repetition of the set of repetitions including one or more symbol periods for an instance of the repeated control information. The operations of 2105 may be performed according to the methods described herein. In some examples, aspects of the operations of 2105 may be performed by a configuration module as described with reference to FIGS. 14 through 17.

At 2110, the base station may precode a first subset of repetitions of the set of repetitions according to a first type of precoder granularity. The operations of 2110 may be performed according to the methods described herein. In some examples, aspects of the operations of 2110 may be performed by a first precoder module as described with reference to FIGS. 14 through 17.

At 2115, the base station may precode a second subset of repetitions of the set of repetitions according to a second type of precoder granularity. The operations of 2115 may be performed according to the methods described herein. In some examples, aspects of the operations of 2115 may be performed by a second precoder module as described with reference to FIGS. 14 through 17.

At 2120, the base station may transmit, to a UE, the set of repetitions of the control information, including the first subset of repetitions and the second subset of repetitions. The operations of 2120 may be performed according to the methods described herein. In some examples, aspects of the operations of 2120 may be performed by a control information module as described with reference to FIGS. 14 through 17.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:

receiving, via a first subset of repetitions of a set of repetitions of control information, a first set of demodulation reference signals and a first instance of the control information; and receiving, via a second subset of repetitions of the set of repetitions of the control information, a second set of demodulation reference signals and a second instance of the control information, a first set of resource elements allocated for the first set of demodulation reference signals per repetition of the first subset of repetitions comprising additional resource elements compared to a second set of resource elements allocated for the second set of demodulation reference signals per repetition of the second subset of repetitions in accordance with a configuration for reception of the control information via a downlink control channel, and the first instance of the control information rate matched around the additional resource elements, or the first set of demodulation reference signals puncturing the additional resource elements, or both, wherein the control information is decoded based at least in part on the first set of demodulation reference signals and the second set of demodulation reference signals.

2. The method of claim 1, wherein a first quantity of resource elements allocated for the first set of demodulation reference signals per repetition of the first subset of repetitions is greater than a second quantity of resource elements allocated for the second set of demodulation reference signals per repetition of the second subset of repetitions.

3. The method of claim 1, further comprising:

identifying a first quantity of resource elements allocated for the first set of demodulation reference signals per repetition of the first subset of repetitions and a second quantity of resource elements allocated for the second set of demodulation reference signals per repetition of the second subset of repetitions based at least in part on a quantity of repetitions of the set of repetitions of the control information, an index of each repetition in the set of repetitions of the control information in accordance with a demodulation reference signal pattern, or a combination thereof.

4. The method of claim 1, wherein the second subset of repetitions is located at a beginning of the set of repetitions of the control information, an end of the set of repetitions of the control information, a middle of the set of repetitions of the control information, distributed throughout the set of repetitions of the control information, or any combination thereof.

5. The method of claim 1, further comprising:

identifying one or more power parameters in accordance with the configuration for reception of the control information, the one or more power parameters indicating a first energy per resource element (EPRE) ratio between first resource elements associated with the first set of demodulation reference signals and second resource elements associated with the first instance of the control information for the first subset of repetitions.

6. The method of claim 5, wherein the one or more power parameters indicate the first EPRE ratio for the first subset of repetitions and the second subset of repetitions.

7. The method of claim 5, wherein the one or more power parameters further indicate a second EPRE ratio between third resource elements associated with the second set of demodulation reference signals and fourth resource elements associated with the second instance of the control information for the second subset of repetitions, the second EPRE ratio different than the first EPRE ratio.

8. The method of claim 1, wherein receiving the second set of demodulation reference signals comprises:

receiving, via a symbol period prior to the set of repetitions of the control information, the second set of demodulation reference signals, wherein the configuration for reception of the control information indicates resources for the second set of demodulation reference signals.

9. The method of claim 1, further comprising:
identifying a first pattern for receiving the first set of demodulation reference signals, the second set of demodulation reference signals, or both in accordance with the configuration for reception of the control information, the first pattern indicating resource element locations for receiving one or more demodulation reference signals for each repetition of the set of repetitions of the control information.

10. The method of claim 9, further comprising:
identifying a second pattern for receiving a third set of demodulation reference signals via a second set of repetitions of the control information in accordance with the configuration for reception of the control information, the second pattern indicating second resource element locations for receiving one or more second demodulation reference signals for each repetition of the second set of repetitions of the control information.

11. The method of claim 1, wherein symbol periods of a set of symbol periods corresponding to the set of repetitions of the control information are contiguous in a time domain.

12. The method of claim 1, further comprising:
receiving a configuration message from a network device, wherein the configuration message indicates the configuration for reception of the control information.

13. A method for wireless communications at a network device, comprising:
transmitting, via a first subset of repetitions of a set of repetitions of control information, a first set of demodulation reference signals and a first instance of the control information; and
transmitting, via a second subset of repetitions of the set of repetitions of the control information, a second set of demodulation reference signals and a second instance of the control information,
a first set of resource elements allocated for the first set of demodulation reference signals per repetition of the first subset of repetitions comprising additional resource elements compared to a second set of resource elements allocated for the second set of demodulation reference signals per repetition of the second subset of repetitions in accordance with a configuration for reception of the control information via a downlink control channel, and
the first instance of the control information rate matched around the additional resource elements, or the first set of demodulation reference signals puncturing the additional resource elements, or both.

14. The method of claim 13, further comprising:
identifying one or more power parameters in accordance with the configuration for reception of the control information, the one or more power parameters indicating a first energy per resource element (EPRE) ratio between first resource elements associated with the first set of demodulation reference signals and second resource elements associated with the first instance of the control information for the first subset of repetitions; and
transmitting the first set of demodulation reference signals and the first instance of the control information in accordance with the one or more power parameters.

15. The method of claim 14, wherein the one or more power parameters indicate the first EPRE ratio for the first subset of repetitions and the second subset of repetitions.

16. The method of claim 14, wherein the one or more power parameters further indicate a second EPRE ratio between third resource elements associated with the second set of demodulation reference signals and fourth resource elements associated with the second instance of the control information for the second subset of repetitions, the second EPRE ratio different than the first EPRE ratio.

17. The method of claim 13, wherein transmitting the second set of demodulation reference signals comprises:
transmitting, via a symbol period prior to the set of repetitions of the control information, the second set of demodulation reference signals.

18. The method of claim 13, further comprising:
identifying a first pattern for transmitting the first set of demodulation reference signals, the second set of demodulation reference signals, or both in accordance with the configuration for reception of the control information, the first pattern indicating resource element locations for transmitting one or more demodulation reference signals for each repetition of the set of repetitions of the control information.

19. An apparatus for wireless communications at a user equipment (UE), comprising:
at least one processor; and
at least one memory coupled with the at least one processor and storing instructions executable by the at least one processor to cause the UE to:
receive, via a first subset of repetitions of a set of repetitions of control information, a first set of demodulation reference signals and a first instance of the control information; and
receive, via a second subset of repetitions of the set of repetitions of the control information, a second set of demodulation reference signals and a second instance of the control information,
a first set of resource elements allocated for the first set of demodulation reference signals per repetition of the first subset of repetitions comprising additional resource elements compared to second set of resource elements allocated for the second set of demodulation reference signals per repetition of the second subset of repetitions in accordance with a configuration for reception of the control information via a downlink control channel, and
the first instance of the control information rate matched around the additional resource elements, or the first set of demodulation reference signals puncturing the additional resource elements, or both,
wherein the control information is decoded based at least in part on the first set of demodulation reference signals and the second set of demodulation reference signals.

20. The apparatus of claim 19, wherein a first quantity of resource elements allocated for the first set of demodulation reference signals per repetition of the first subset of repetitions is greater than a second quantity of resource elements allocated for the second set of demodulation reference signals per repetition of the second subset of repetitions.

21. The apparatus of claim 19, wherein the instructions are further executable by the at least one processor to cause the UE to:

identify one or more power parameters in accordance with the configuration for reception of the control information, the one or more power parameters indicating a first energy per resource element (EPRE) ratio between first resource elements associated with the first set of demodulation reference signals and second resource elements associated with the first instance of the control information for the first subset of repetitions.

22. The apparatus of claim 21, wherein the one or more power parameters indicate the first EPRE ratio for the first subset of repetitions and the second subset of repetitions.

23. The apparatus of claim 21, wherein the one or more power parameters further indicate a second EPRE ratio between third resource elements associated with the second set of demodulation reference signals and fourth resource elements associated with the second instance of the control information for the second subset of repetitions, the second EPRE ratio different than the first EPRE ratio.

24. The apparatus of claim 19, wherein the instructions to receive the second set of demodulation reference signals are executable by the at least one processor to cause the UE to:
receive, via a symbol period prior to the set of repetitions of the control information, the second set of demodulation reference signals.

25. The apparatus of claim 19, wherein the instructions are further executable by the at least one processor to cause the UE to:
identify a first pattern for receiving the first set of demodulation reference signals, the second set of demodulation reference signals, or both in accordance with the configuration for reception of the control information, the first pattern indicating resource element locations for receiving one or more demodulation reference signals for each repetition of the set of repetitions of the control information.

26. An apparatus for wireless communications at a network device, comprising:
at least one processor; and
at least one memory coupled with the at least one processor and storing instructions executable by the at least one processor to cause the network device to:
transmit, via a first subset of repetitions of a set of repetitions of control information, a first set of demodulation reference signals and a first instance of the control information; and
transmit, via a second subset of repetitions of the set of repetitions of the control information, a second set of demodulation reference signals and a second instance of the control information,
a first set of resource elements allocated for the first set of demodulation reference signals per repetition of the first subset of repetitions comprising additional resource elements compared to a second set of resource elements allocated for the second set of demodulation reference signals per repetition of the second subset of repetitions in accordance with a configuration for reception of the control information via a downlink control channel, and
the first instance of the control information rate matched around the additional resource elements, or the first set of demodulation reference signals puncturing the additional resource elements, or both.

27. The apparatus of claim 26, wherein the instructions are further executable by the at least one processor to cause the network device to:
identify one or more power parameters in accordance with the configuration for reception of the control information, the one or more power parameters indicating a first energy per resource element (EPRE) ratio between first resource elements associated with the first set of demodulation reference signals and second resource elements associated with the first instance of the control information for the first subset of repetitions; and
transmit the first set of demodulation reference signals and the first instance of the control information in accordance with the one or more power parameters.

28. The apparatus of claim 26, wherein the instructions to transmit the second set of demodulation reference signals are executable by the at least one processor to cause the network device to:
transmit, via a symbol period prior to the set of repetitions of the control information, the second set of demodulation reference signals.

29. The apparatus of claim 26, wherein the instructions are further executable by the at least one processor to cause the network device to:
identify a first pattern for transmitting the first set of demodulation reference signals, the second set of demodulation reference signals, or both in accordance with the configuration for reception of the control information, the first pattern indicating resource element locations for transmitting one or more demodulation reference signals for each repetition of the set of repetitions of the control information.

30. An apparatus for wireless communications at a user equipment (UE), comprising:
means for receiving, via a first subset of repetitions of a set of repetitions of control information, a first set of demodulation reference signals and a first instance of the control information; and
means for receiving, via a second subset of repetitions of the set of repetitions of the control information, a second set of demodulation reference signals and a second instance of the control information,
a first set of resource elements allocated for the first set of demodulation reference signals per repetition of the first subset of repetitions comprising additional resource elements compared to a second set of resource elements allocated for the second set of demodulation reference signals per repetition of the second subset of repetitions in accordance with a configuration for reception of the control information via a downlink control channel, and
the first instance of the control information rate matched around the additional resource elements, or the first set of demodulation reference signals puncturing the additional resource elements, or both,
wherein the control information is decoded based at least in part on the first set of demodulation reference signals and the second set of demodulation reference signals.

* * * * *